US007634264B2

(12) United States Patent
Yahagi

(10) Patent No.: US 7,634,264 B2
(45) Date of Patent: Dec. 15, 2009

(54) MOBILE COMMUNICATION SYSTEM, MOBILE TERMINAL, BASE STATION, RADIO NETWORK CONTROLLER, INFORMATION RATE CONTROL METHOD THEREFOR AND PROGRAM THEREFOR

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 11/167,171

(22) Filed: Jun. 28, 2005

(65) Prior Publication Data

US 2006/0003703 A1 Jan. 5, 2006

(30) Foreign Application Priority Data

Jun. 30, 2004 (JP) ............... 2004-192386

(51) Int. Cl.
*H04W 4/00* (2006.01)
*H04B 17/00* (2006.01)
*H04B 7/00* (2006.01)

(52) U.S. Cl. ............ 455/422.1; 455/69; 455/67.11

(58) Field of Classification Search ............ 455/422.1, 455/431, 432.1–432.3, 95, 96, 99, 152.1, 455/345, 67.13, 69, 226.1, 226.3, 7, 11.1, 455/67.11

See application file for complete search history.

(56) References Cited

U.S. PATENT DOCUMENTS

2002/0045444 A1  4/2002  Usher et al.

FOREIGN PATENT DOCUMENTS

| EP | 1 416 755 A2 | 5/2004 |
| EP | 1 458 150 A2 | 9/2004 |
| JP | 7-154856 A | 6/1995 |
| JP | 2001-44930 A | 2/2001 |

*Primary Examiner*—Eugene Yun
(74) *Attorney, Agent, or Firm*—Sughrue Mion, PLLC

(57) ABSTRACT

A method according to the present invention comprises determining an available information rate for communication, via a first base station, between a plurality of terminals and a second base station based on link capacity information for wireless communication between the first base station and the second base station, and controlling each of information rates for the communication between the plurality of terminals and the second base station based on the available information rate. Here, the plurality of terminals and the first base station being in a mobile object, the second base station being outside the mobile object.

8 Claims, 18 Drawing Sheets

USER TERMINAL 1-1, 1-2

RADIO BASE STATION IN MOBILE OBJECT 2-2

MOBILE COMMUNICATION SYSTEM, MOBILE TERMINAL, BASE STATION, RADIO NETWORK CONTROLLER, INFORMATION RATE CONTROL METHOD THEREFOR AND PROGRAM THEREFOR

This application is based upon and claims the benefit of priority from Japanese Patent Application No. 2004-192386, filed on Jun. 30, 2004, the content of which is incorporated herein by reference.

BACKGROUND OF THE INVENTION

1. Technical Field

The present invention relates to a mobile communication system, a mobile terminal, a radio base station, a radio network controller, a method for controlling an information rate for the information transmitted to and from the mobile, and a program therefor. More particularly, the present invention relates to a mobile communication system in which the mobile terminal and the base station are in a mobile objects and the mobile terminal originates or terminates a call via the radio base station.

2. Description of the Related Art

Mobile communication systems are desired to allow user terminals to perform communication at any time in any place. The user terminals are mobile terminals and each of the user terminals must be assigned a communication channel irrespective of the moving states of the user terminals or the distribution thereof so as to perform communication at any time in any place.

In conventional mobile communication systems, user terminals can perform communication irrespective of whether the user terminals stand still, are carried by walking users, or stay on vehicles.

As an example of the system described above, the Japanese Laid-Open Patent Application No. 2001-44930 shows a communication system in which user terminals communicate with a radio base station that is installed on the ground or disposed in a building on a stationary basis. Further, as another example of the system above, the Japanese Laid-Open Patent Application No. 07-154856 shows a communication system in which a mobile radio base station such as a communications satellite communicates with user terminals while moving along an orbit or the like.

In these communication system shown in the Japanese Laid-Open Patent Applications, even if a user terminal lies in a vehicle, a train or any other mobile object, the user terminal communicates with a radio base station located outside the mobile object. Accordingly, even though the user terminal does not move relatively to the mobile object, the user terminal is affected by the movement of the mobile object relative to the radio base station. Therefore, the user terminal lying in the mobile object and the radio base station disposed outside the mobile object on a stationary basis must have many control functions included therein.

Furthermore, in this case, the radio base station disposed outside the mobile object needs the same number of radio control units as the number of user terminals that lie in the mobile object. The radio control units maintain the communication with the respective user terminals that lie in the mobile object.

In order to improve a mobile communication system in terms of the problem described above, a communication system called Moving Network is proposed. In the communication network, the communication between a radio base station disposed outside the mobile object and the mobile object may be established via a base station in the mobile object using an integrated single radio link irrespective of the number of user terminals lying in the same mobile object.

The mobile communication system called Moving Network has been proposed in order to provide a mobile communication service, which is equivalent to that for user terminals outside a mobile object, for user terminals that lie in the mobile object, such as a train or a bus that moves on the ground, a marine vessel that moves on the sea and an airplane that moves in the air.

In the Moving Network, a base station is implemented in a mobile object that communicates with a base station located outside the mobile object. User terminals existing in a mobile object communicate with a base station in the mobile object rather than a base station outside the mobile object.

FIG. 22 schematically shows the moving network. Referring to FIG. 22, the moving network comprises a radio network controller 14, a radio base station outside a mobile object (B) 12-1, a relay base station 13, radio base station in the mobile object (B) 12-2, a user terminal outside the mobile object (B) 1-3 and user terminals in the mobile object (B) 11-1 and 11-2. The radio network controller 14 is connected to a plurality of radio base stations including the base station 12-1 and maintains communications with the user terminals while the user terminals move within a service area. The radio base station 12-1 is normally installed on a stationary basis. The radio base station 12-1 can be connected to the user terminals over a radio link.

The relay base station 13 within the mobile object B has a relay facility via which communication is established with the user terminals 11-1 and 11-2 lying in the mobile object B. The relay base station 13 includes a communication facility via which communication is established with the stationary radio base station 12-1, and a communication facility via which communication is established with the radio base station 12-2. The radio base station 12-2 establishes communication with the user terminals 1-1 and 1-2 in the mobile object B.

One of advantages of the moving network architecture is that a use efficiency of a radio link between the radio station in a moving object and a base station outside the moving object can be improved by employing a high-performance processing unit and high-precision antenna facilities in these base stations.

Another advantage of the moving network is that the user terminal needs to transmit radio waves with an intensity sufficient only to be propagated from a user terminal to the base station in the mobile object, providing an improved use efficiency of a resource of radio waves. This advantage is highly appreciated because, in most cases, the user terminal is equipped with an omni-directional antenna which has a directivity in all directions which transmits radio waves to all directions and may provide a deteriorated use efficiency of a radio resource of radio waves. Here, in most cases, the user terminal is equipped with an omni-directional antenna because the physical size of a user terminal is limited, the throughput of a processor employed is limited, and it is hard to determine the direction of radio waves propagated from the user terminal or the direction of radio waves to be received by the user terminal while the user terminal moves within a mobile object.

Next, a control method regarding the moving network for controlling transmit power of radio-waves and a information rate for communication between a user terminal and a base station in a moving object will be explained. A base station and a relay base station in a mobile object communicates with a radio base station disposed outside the mobile object within a service area covered by the mobile communication system. A communication link employed for general user terminals is used even for the communication between the relay base station and the base station outside the mobile object unless there is a communication link dedicated to the mobile object.

While a mobile object is moving, if the mobile object enters an area in which many user terminals perform communication, a radio link capacity usable by the mobile object diminishes. In addition, the link capacity may be changed due to a change in radio-wave propagation condition.

Where the radio link capacity diminishes, if transmission power for the user terminals in the mobile object to perform communication is held intact, interference power that adversely affects other user terminals in the mobile object increases. Consequently, an information error occurs at the user terminals. Therefore, power must be reduced by controlling transmission power according to the radio link capacity.

However, when transmission power is merely decreased, an information error occurs in information being transmitted to or received from the user terminals in the mobile object. In order to avoid information errors, an information rate must be lowered along with a decrease in the radio link capacity.

A information rate may be adjusted by changing a compression ratio as long as, for example, a voice service is provided using a compression voice coder/decoder. The information rate is usually varied depending on whether a speaker utters voice. However, the information rate may be varied when the capacity of a radio link is increased or decreased. For reference, when a compression ratio is increased, voice becomes coarse. On the other hand, when the compression ratio is decreased, voice becomes fine. If a shortage in a radio link capacity occurs, a speaker may sacrifice quality of voice and increase the compression ratio. Thus, the radio link capacity can be saved. However, a listening side cannot listen to clear voice. The foregoing treatment should preferably be performed because even when audio information exhibits a high information rate, if the audio information contains numerous information errors, normal voice cannot be reproduced. Moreover, although a radio link capacity diminishes, if communication proceeds at a high information rate, radio communication powers to be supplied to other user terminals will be interfered.

In the moving network, the relay unit interposed between the user terminals and the radio base station installed outside the mobile object is generally a mere relay facility. Therefore, normally, transmission power and a information rate may be controlled according to a control procedure described below.

That is, the control procedure comprises:

(1) Assessing a radio link capacity between a relay unit in a mobile object and a radio base station disposed outside the mobile object, and detecting a decrease in the capacity;

(2) Reducing transmission power so as to adjust the transmission power in line with the link capacity;

(3) Neglecting a reception error occurring in communication between the relay unit in the mobile object and the radio base station disposed outside the mobile object because the transmission power cannot be increased;

(4) Detecting occurrence of a reception error in communication between the radio base station and any of the user terminals in the mobile object (the reception error in information may occur at the user terminals independently of one another);

(5) Decreasing an information rate for the communication between each user terminal and the radio base station in the moving object through negotiation between each user terminal and a voice coder included in core equipment;

(6) Recognizing a decrease in the number of errors in communication between each user terminal and the base station in the mobile object;

(7) Observing a decrease in the number of reception errors in communication between the relay unit in the mobile object and the radio base station disposed outside the mobile object; and (8) Continuing the communication at the information rate suitable for the link capacity between the relay unit in the mobile object and the radio base station disposed outside the mobile object.

According to the foregoing conventional control procedure, a capacity of a radio link between the mobile object and the radio base station disposed outside the mobile object is assessed in order to detect a decrease in the capacity. Thereafter, transmission power for communication between them is reduced, and then a user terminal experiences errors in received information due to the transmission power reduction. Finally, the user terminal reduces the information rate so as to reduce the number of the errors. Thus, the problem regarding the conventional control procedure is that it takes a long time to cope with a decrease in a link capacity and a user experiences defective communication until the information rate is reduced and the procedure is completed.

BRIEF SUMMARY OF THE INVENTION

An exemplary object of the present invention is to solve the foregoing problems and to provide an improved mobile communication system wherein a information rate for communication performed by a user terminal in a mobile object can be adjusted quickly and an error in the communication can be suppressed.

A method according to the present invention comprises determining an available information rate for communication, via a first base station, between a plurality of terminals and a second base station based on link capacity information for wireless communication between the first base station and the second base station, and controlling each of information rates for the communication between the plurality of terminals and the second base station based on the available information rate. Here, the plurality of terminals and the first base station being in a mobile object, the second base station being outside the mobile object.

BRIEF DESCRIPTION OF THE DRAWINGS

These and other features, aspects, and advantages of the present invention will become better understood with reference to the following description, amended claims, and accompanying drawings, which should not be read to limit the invention in any way, in which:

DETAILED DESCRIPTION OF THE INVENTION

Figure 1:
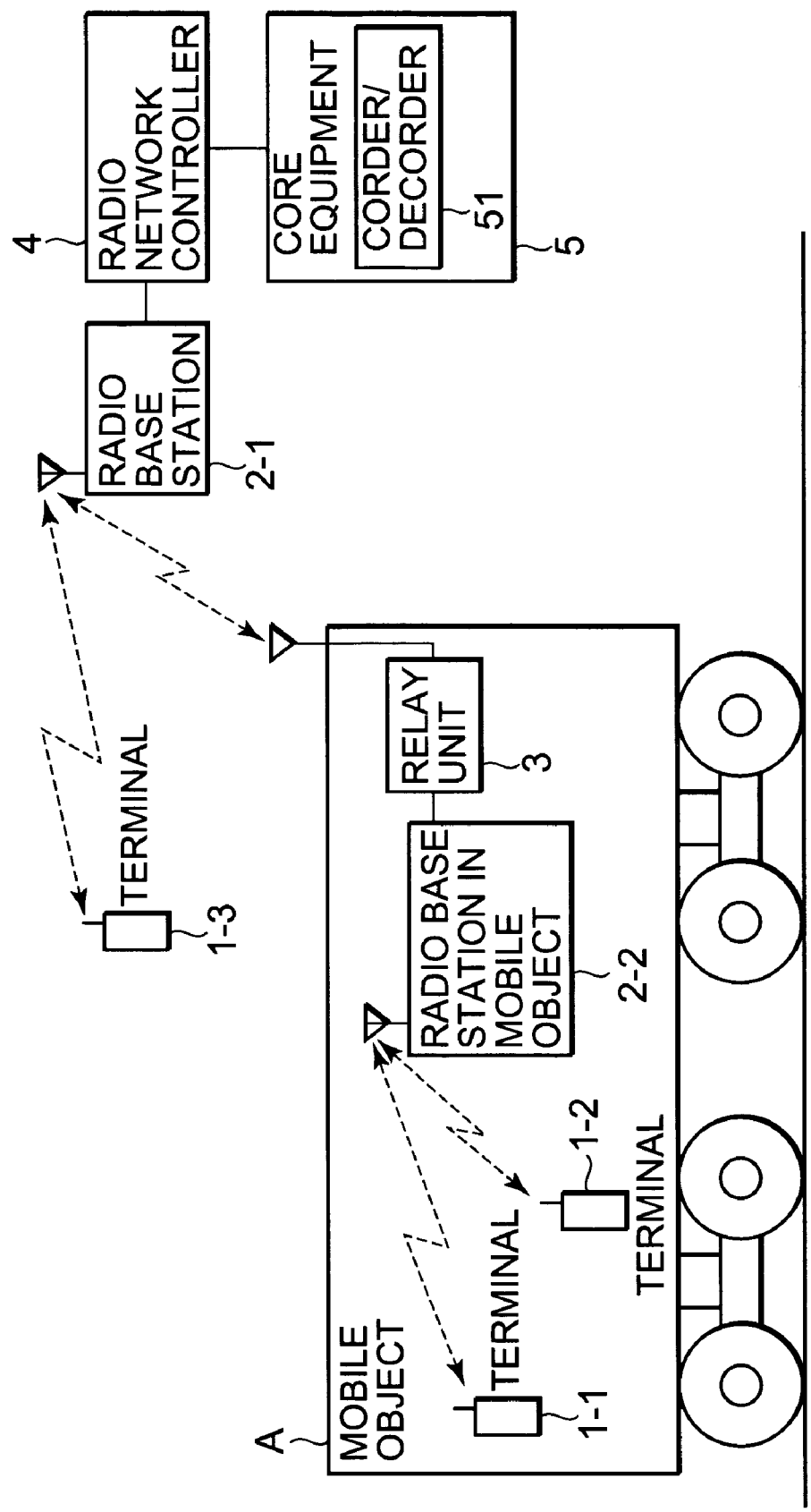
FIG. 1 shows a configuration of a mobile communication system in accordance with a first exemplary embodiment.

In a mobile communication system according to the present intention, a user terminal in a mobile object, such as a train, an automobile, a plane and so on, communicates, via a first base station in the mobile object, with the second base station outside the mobile object. Both the communication between the user terminal and the first base station and between the first base station and second base station are wireless communication. The user terminal communicates with the second base station or a core equipment coupled to the second base station at a certain information rate.

A radio network controller coupled to the second base station controls the information rate based on a capacity of a link between the first base station and second base station. Specifically, the radio network controller may determine an available information rate based on the link capacity and controls the information rate based on the available information rate. The available information rate may be determined by a calculation based on the link capacity or may be determined by a predetermined relation between the link capacity and the available information rate. For example, the link capacity may be represented by at least one of noise power or interference power received at the first base station or the second base station. Furthermore, the available information rate may be determined based on a predetermined relation between at least one of the noise power or the interference power and the available information rate (e.g., a look-up table). The radio network controller may separately control an information rate for uplink communication (an uplink information rate) based on an uplink capacity and an information rate for downlink communication (a downlink information rate) based on a downlink capacity. Specifically, the radio network controller may control the uplink information rate by instructing the user terminal to change the uplink information rate. Similarly, the radio network controller may control the downlink information rate by instructing the core equipment or the second base station to change the downlink information rate.

Information about the link capacity may be sent from at least one of the first base station or the second base station to the radio network controller. Specifically, the first base station in the mobile object may measure a downlink capacity and may send downlink capacity information to the radio network controller. Similarly, the second radio base station outside the mobile object may measure an uplink capacity and may send uplink capacity information to the radio network controller.

Additionally, the radio network controller may send a request for the link capacity information to at least one of the first base station or the second base station and may receive the link capacity information as a response to the request. Furthermore, the radio network controller may receive the link capacity information that is voluntarily sent by at least one of the first base station or the second base station.

Accordingly, the information rate may be adjusted quickly, suppressing a communication error due to a change in the link capacity.

Exemplary embodiments of the invention are described below with reference to the attached figures. The described exemplary embodiments are intended to assist in the understanding of the invention and are not intended to limit the scope of the invention in any way.

FIG. 1 is a block diagram showing the configuration of a mobile communication system in accordance with a first exemplary embodiment. The mobile communication system provides the same mobile communication service to user terminals 1-1 and 1-2 which exist in a mobile object A as that to a user terminal 1-3 located outside the mobile object A. The mobile object A may be a train and a bus that moves on the ground, a marine vessel that moves on the sea, an airplane that moves in the air and so on.

Referring to FIG. 1, the mobile communication system in accordance with the first exemplary embodiment of the present invention comprises the user terminals 1-1 and 1-2 in the mobile object A, the user terminal 1-3 outside the mobile object A, a radio base station 2-1 disposed outside the mobile object A (hereinafter, radio base station 2-1 outside the mobile object A), a radio base station 2-2 in the mobile object A, a relay unit 3, base station control equipment (or a radio network controller (RNC)) 4, and core equipment 5.

The mobile communication system in accordance with the first exemplary embodiment of the present invention may be a system called a moving network in which communication is established between each of the user terminals 1-1 and 1-2 in the mobile object A and the radio base station 2-1 via the radio base station 2-2 and the relay unit 3 in the mobile object A. The radio base station 2-2 and the relay unit 3 may be incorporated with each other to be a single apparatus.

Figure 2:
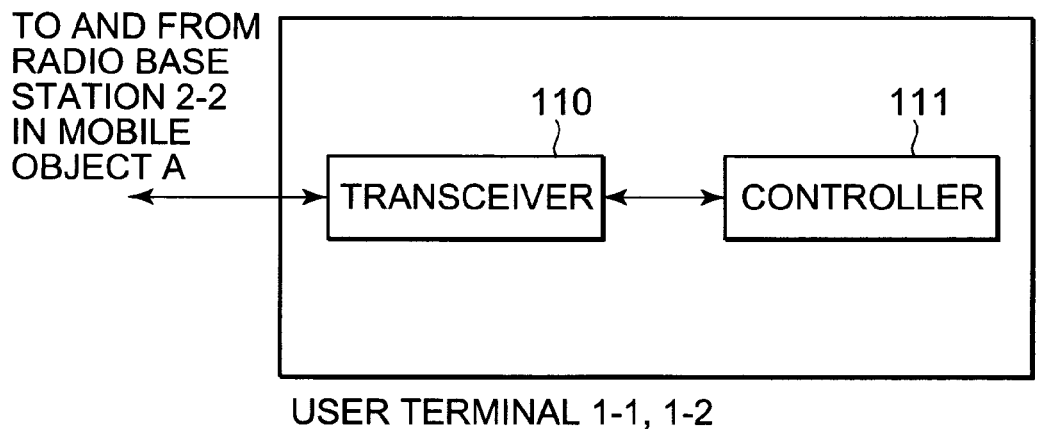
FIG. 2 shows a structure of a user terminal shown in FIG. 1.

FIG. 2 shows a structure of the user terminal 1-1 and 1-2. As shown in FIG. 2, the user terminal 1-1 and 1-2 comprises a transceiver 110 and controller 111. The transceiver 110 is configured to transmit wireless signals to the radio base station 2-2 in the mobile object and to receive wireless signals from the radio base station 2-2. Further more, the transceiver 110 is configured to sends signals to the controller 111 and to receive signals from the controller 111. The controller 111 is configured to control the user terminal voluntarily or based on signals from the radio base station 2-2. For example, the controller 111 is configured to control transmission power of wireless signal transmitted from the transceiver 110 and an information rate for the communication between the user terminal and the core equipment 5. For example, the controller 111 may change the information rate by changing the number of codes per unit time in encoding information to be transmit by the transceiver 110.

The radio base station 2-2 in the mobile object A establishes a communication with each of the user terminals 1-1 and 1-2 in the mobile object A.

Figure 3:
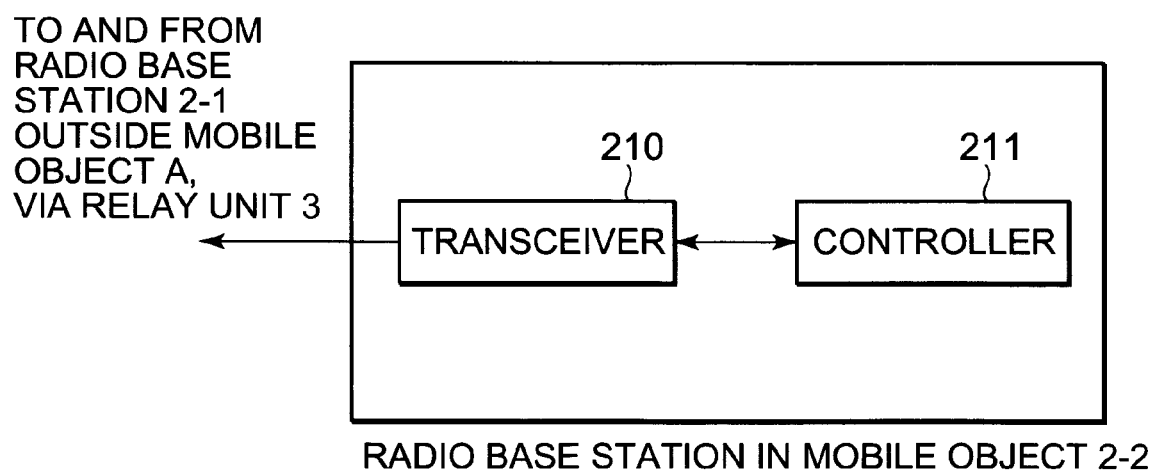
FIG. 3 shows a structure of a relay unit shown in FIG. 1.

FIG. 3 shows a structure of the radio base station 2-2 in the mobile object A. As shown in FIG. 3, the radio base station 2-2 comprises a transceiver 210 and a controller 211. The transceiver 210 is configured to transmit wireless signals to the user terminal 1-1 and 1-2 in the mobile object A and to receive wireless signal from the user terminal 1-1 and 1-2. Also, the transceiver 210 is configured to transmit signals to the radio base station 2-1 outside the mobile object A via the relay unit 3 in the mobile object A and to receive signals from the radio base station 2-1 via the relay unit 3. The controller 211 is configured to control the radio base station 2-2 voluntarily or based on signals from the radio base station 2-1. For example, the controller 211 is configured to control transmission power of wireless signal transmitted from the transceiver 210.

The relay unit 3 in the mobile object A is responsible for establishing a communication between each of the user terminals 1-1 and 1-2 in the mobile object A and the radio base station 2-1 outside the mobile object A.

Figure 4:
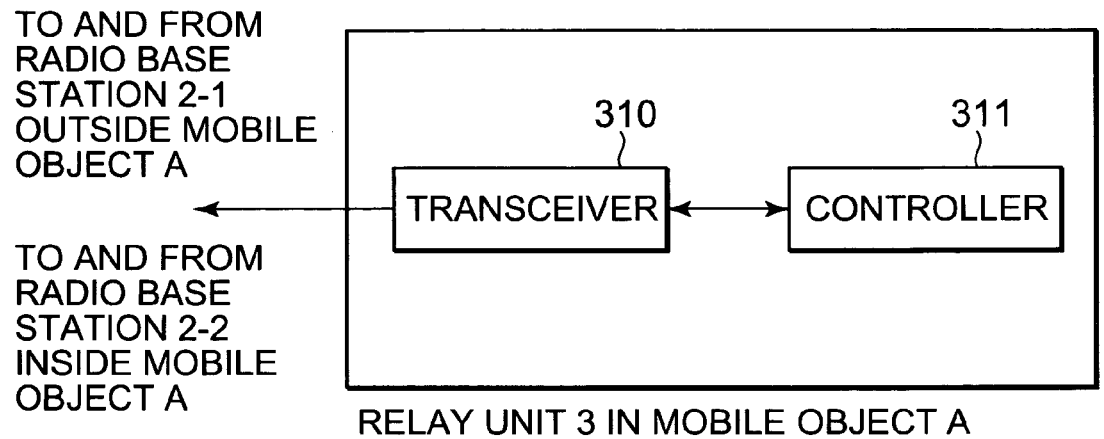
FIG. 4 shows a structure of a radio base station in a mobile object shown in FIG. 1.

FIG. 4 shows a structure of the relay unit 3. As shown in FIG. 4, the relay unit 3 comprises a transceiver 310 and a controller 311. The transceiver 310 is configured to transmit wireless signals to the base station 2-1 outside the mobile object A and to receive wireless signal from the base station 2-1. Also, the transceiver 310 is configured to transmit signals to the radio base station 2-2 in the mobile object A and to receive signals from the radio base station 2-2. The controller 311 is configured to control the relay unit 3 voluntarily or based on signals from the radio base station 2-1. For examples, the controller 311 is configured to control transmission power of wireless signal transmitted from the transceiver 310. Further, the controller 311 is configured to observe or measure a link capacity for communication between the relay base station 3 and the radio base station 2-1 outside the mobile object A. For example, the controller 311 may observe or measure the link capacity by measuring an error rate on information received by the transceiver 310 via wireless signals, such as a bit error rate (BER), a frame error rate (FER), a symbol error rate/ratio (SER) and so on or by measuring a signal to noise ratio (SNR), a carrier to interference ratio (CIR) and so on.

The radio base station 2-2 and the relay unit 3 may be incorporated with each other. In this case, the controller 211 and the controller 311 may be incorporated with each other. Also, the transceiver 210 and the transceiver 310 may be incorporated with each other.

Figure 5:
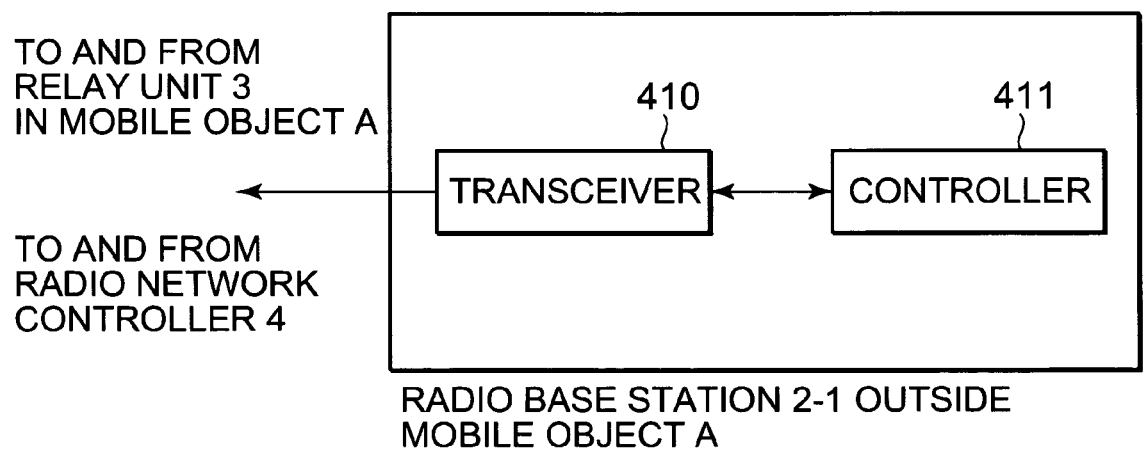
FIG. 5 shows a structure of a radio base station outside the mobile shown in FIG. 1.

FIG. 5 shows a structure of the radio base station 2-1. As shown in FIG. 5, the radio base station 2-1 comprises a transceiver 410 and a controller 411. The transceiver 410 is configured to transmit wireless signals to the relay unit 3 in the mobile object A and to receive wireless signal from the relay unit 3. Also, the transceiver 410 is configured to transmit signals to the radio network controller 4 and to receive signals from the radio network controller 4. The controller 411 is configured to control the radio base station 2-1 voluntarily or based on signals from the radio network controller 4 or the relay base station 3. For examples, the controller 411 is configured to control transmission power of wireless signal transmitted from the transceiver 410. Further, the controller 411 is configured to observe or measure a link capacity for communication between the relay base station 3 and the radio base station 2-1. For example, the controller 411 may observe or measure the link capacity by measuring an error rate on information received by the transceiver 410 via wireless signals, such as a bit error rate (BER), a frame error rate (FER), a symbol error rate/ratio (SER) and so on or by measuring a signal to noise ratio (SNR), a carrier to interference ratio (CIR) and so on.

In the mobile communication system in accordance with the present embodiment, the user terminals 1-1, 1-2 and 1-3 communicate with the core equipment 5 via the radio base station 2-1. The user terminal 1-3 outside the mobile object A, communicates directly with the radio base station 2-1 outside the mobile object A. On the other hand, as described above, the user terminal 1-1 or 1-2 in the mobile object A communicate with the radio base station 2-1 outside the mobile object A via the relay base station 3 and the base station 2-2 in the mobile object A rather than directly with the radio base station 2-1.

Here, a radio link between the radio base station 2-1 outside the mobile object A and the relay unit 3, and a radio link between the radio base station 2-2 in the mobile object A and the user terminal 1-1 or 1-2 in the mobile object A may use signals in the identical frequency band with each other or signals in different frequency bands than each other.

The communication between the radio base station 2-1 outside the mobile object A and the relay unit 3 is equivalent to the communication between the radio base station 2-1 outside the mobile object A and the user terminal 1-3 outside the mobile object A. Therefore, transmission power for the communication between the radio base station 2-1 and the relay unit 3 is controlled according to a change in a radio-wave propagation condition between the radio base station 2-1 in order to maintain high communication quality and an optimized traffic while the mobile object A moves.

Conventional transmission power controls can apply to the transmission power control in the present embodiment. Therefore, a detailed explanation of the transmission power control will be omitted but the outline thereof will be given below. Namely, the transmission power control comprises increasing the transmission power so as to compensate for degradation in the quality of received information caused by the positional relationship between an antenna included in the radio base station 2-1 and an antenna included in the relay unit 3, and/or decreasing the transmission power when the quality of received information is higher than predetermined quality. Owing to the transmission power control, the transmission power for the communication between the radio base station 2-1 and the relay unit 3 varies time-sequentially.

The radio link between the radio base station 2-1 and the relay unit 3 comprises a downlink extending from the radio base station 2-1 to the relay unit 3, and a uplink extending from the relay unit 3 to the radio base station 2-1. Transmission power for communication on the downlink and power on the uplink must be controlled independently of each other. The transmission power control in the present embodiment is not limited to the conventional transmission power control described above, and any transmission power controls that can maintain high communication quality and an optimized traffic while the mobile object A moves may apply to the present embodiment. Furthermore, the mobile communication system in the present exemplary embodiment may omit the transmission power control in a situation where only permissible deterioration in communication quality occurs.

Figure 6:
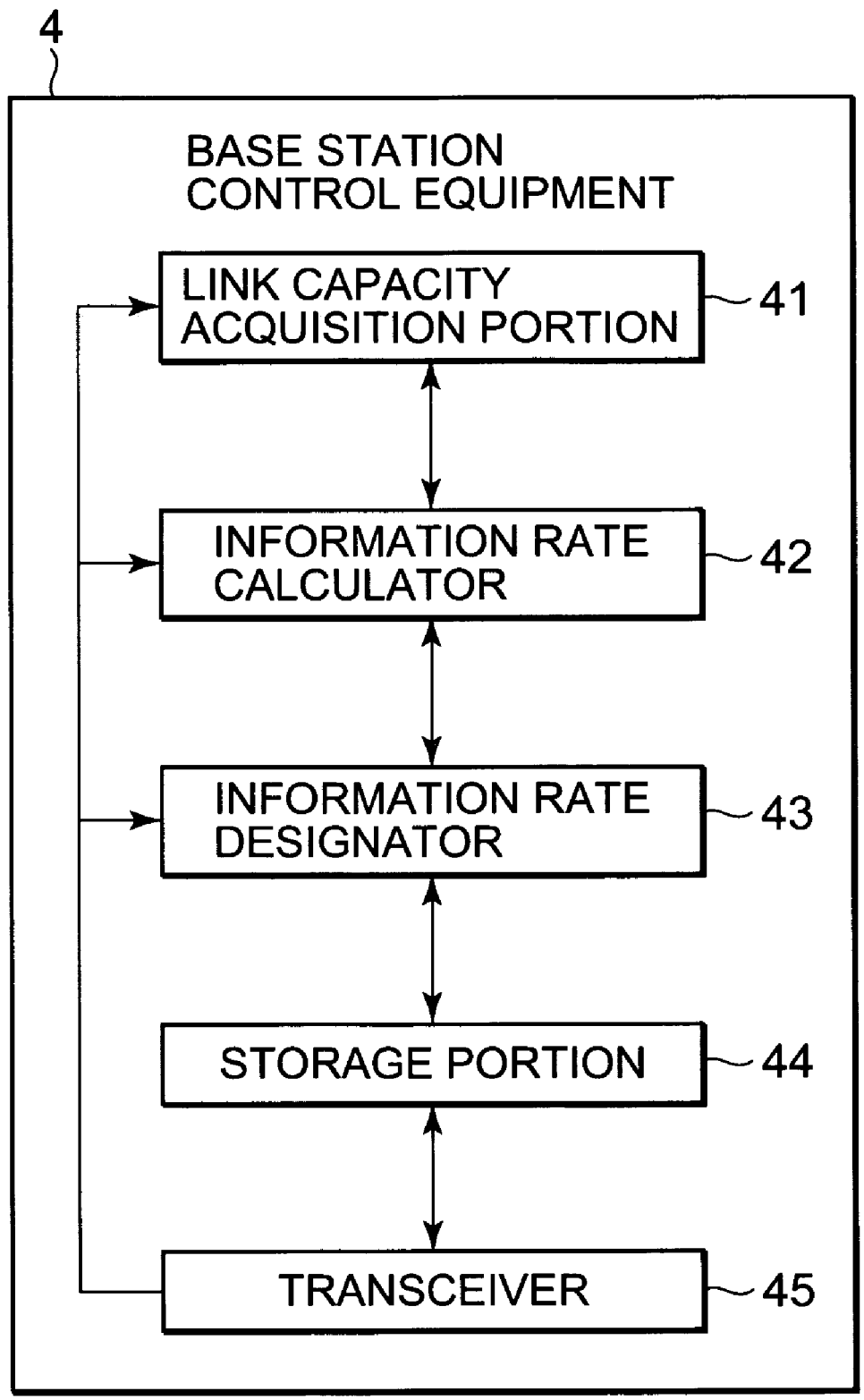
FIG. 6 shows a structure of a radio network controller shown in FIG. 1.

FIG. 6 is a block diagram showing the structure of the radio network controller 4 shown in FIG. 1. Referring to FIG. 6, the radio network controller 4 is responsible for the aforesaid transmission power control, and comprises a link capacity acquiring portion 41, an information rate calculator 42, and an information rate-of-user terminal designator 43, a storage portion 44 and a transceiver 45.

The transceiver 45 is configured to transmit signals to the base station 2-1 and to receive signals from the base station 2-1. Also, the transceiver 45 is configured to transmit signals to the core equipment 5 and to receive signals from the core equipment 5. The link capacity acquiring portion 41 is configured to acquire, via the transceiver 45, capacity of a link between the relay unit 3 in the mobile object A and the radio base station 2-1 outside the mobile object A. The link capacity acquiring portion 41 acquires uplink capacity from the radio base station 2-1 and acquires downlink capacity from the replay radio base station 3. The information rate calculator 42 is configured to calculate an available information rate for the communication between the user terminals 1-1 and 1-2 in the mobile object A and the core equipment 5 by using the link capacities acquired by the link capacity acquiring portion 41. The information rate calculator 42 calculates an available uplink information rate and an available downlink information rate from the uplink capacity and the downlink capacity, respectively.

The information rate designator 43 is configured to designate and control each of information rates for the communication between the user terminals 1-1 and 1-2 and the core equipment 5, so that the sum of the information rates will not exceed the available information rate calculated by the information rate calculator 42.

The radio network controller 4 includes a computer that comprises at least a central processing unit (CPU) (not shown) and a RAM (not shown) that provides a work area for calculation. Programs to be run in the RAM by the CPU are stored in the storage portion 44.

The core equipment 5 comprises a coder/decoder 51. The coder 51 is configured to change the information rate for the communication between the user terminal and the core equipment 5 based on signals from the radio network controller 4 or signals from the user terminal. Specifically, the coder/decoder 51 may change the information rate by changing the number of codes per unit time in encoding information to be transmit to the user terminal 1-1 and/or 1-2. The coder/decoder 51 may be a voice coder/decoder, an image encoder/decoder or any other information production unit. The function and structure of the core equipment 5 described above may be incorporated in the base station 2-1 or the radio network controller 4.

Figure 7:
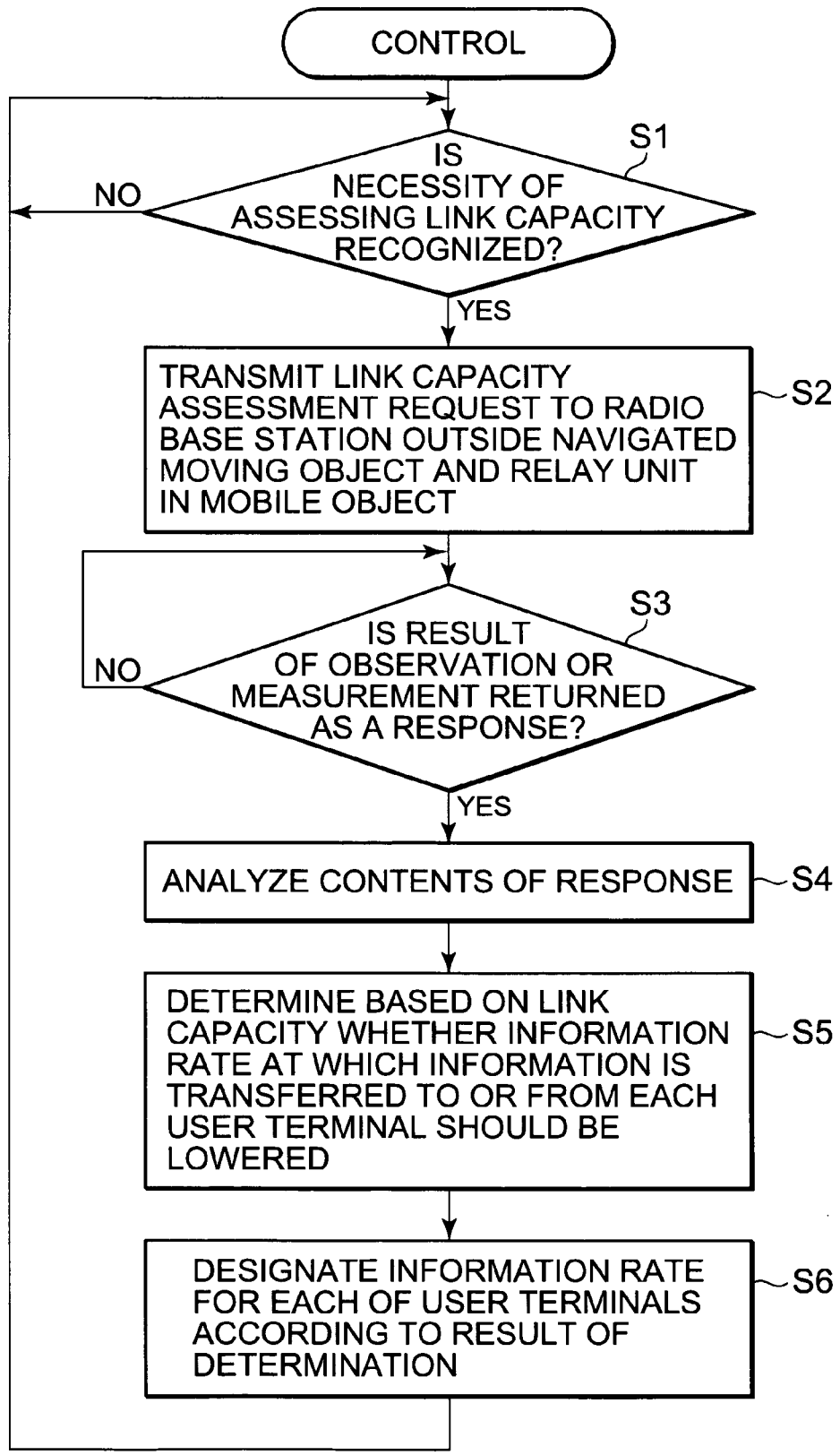
FIG. 7 is a flowchart describing operations to be performed by the radio network controller shown in FIG. 1.

FIG. 7 is a flowchart describing operations to be performed by the radio network controller 4 shown in FIG. 1. The operation of the radio network controller 4 may be obtained based on the structure explained in reference to FIG. 6. Referring to FIG. 1 to FIG. 7, the operations of the radio network controller 4 will be described below. The operations described in FIG. 7 may be obtained by a program that is stored in the storage portion and is run by the CPU.

The radio network controller 4 recognizes the necessity of assessing the capacity of the link between the relay unit 3 in the mobile object A and the radio base station 2-1 outside the mobile object. The radio network controller 4 may recognize the necessity of assessing the link capacity by using a error rate or other physical parameter on the information transferred between the replay radio base station 3 and the base station 2-1. For example, the radio network controller 4 may recognize that it is necessary to assess the link capacity when the error rate or the physical parameter exceeds a predetermined value The error rate or the physical parameter may be a bit error rate (BER), a frame error rate (FER) a symbol error rate/ratio (SER), a signal to noise ratio (SNR), a carrier to interference ratio (CIR) and so on. The error rate or the physical parameter may be measured and sent to the radio network controller 4 by the replay radio base station 3, the radio base station 2-1 or the user terminal 1-1 or 1-2. (step S1 in FIG. 7). The radio network controller 4 then transmits a link capacity assessment request or a request for the link capacity information to both the radio base station 2-1 and the relay unit 3 (step S2 in FIG. 7).

The radio network controller 4 receives link capacity information as a response, which is a result of observation or measurement of link capacity, from the radio base station 2-1 or the relay unit 3. The radio network controller 4 may receive uplink capacity information from the radio base station 2-1 and receive downlink capacity information from the relay unit 3 (step S7 in FIG. 7). The radio network controller 4 then analyzes the contents of the response (step S4 in FIG. 7), and determines based on the radio link capacity information whether an information rate for the communication between the user terminals 1-1 and 1-2 in the mobile object A and the core equipment 5 should be controlled. Specifically, the radio network controller may determine whether the information rate should be controlled based on an available link capacity calculated by using the link capacity information as described above in reference to FIG. 6. Furthermore, the radio base station 4 may determine that it is necessary to decrease the information rate if determining that the transmission power for the communication between the relay unit 3 and the radio base station 2-1 can not be increased so as to improve quality of the communication, such as a error rate, based on the link capacity information. For example, it may be determined whether the transmission power can be increased based on the number of user terminals communicating via the relay unit 3 and so on. Additionally, if necessary, the transmission power for the communication between the relay unit 3 and the radio base station 2-1 may be reduced based on the link capacity information. (step S5 in FIG. 7).

Based on a result of the determination, the radio network controller 4 designates and controls an information rate for each of the user terminals 1-1 and 1-2 (step S6 in FIG. 7). Specifically, the radio network controller 4 may decrease the downlink information rate by giving the core equipment 5 an instruction to decrease the downlink information rate by decreasing the number of codes per unit time in encoding information to be transmitted to the user terminals. On the other hand, the radio network controller 4 may decrease the uplink information rate by giving the user terminal 1-1 and/or 1-2, via radio base station 2-1, the relay base station 3, and the radio base station 2-2, an instruction to decrease the uplink information rate by decreasing the number of codes per unit time in encoding information to be transmit to the core equipment 5.

Figure 8:
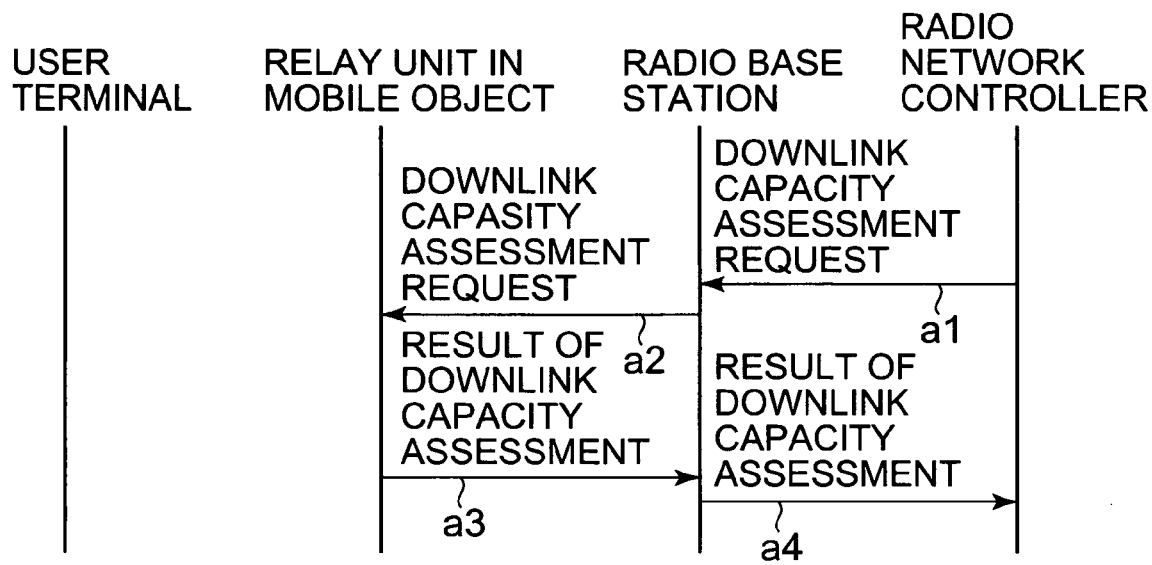
FIG. 8 is a sequence chart showing operations to be performed in the mobile communication system in accordance with the first exemplary embodiment.

FIG. 8 shows a sequence of assessing the downlink capacity between the radio base station 2-1 outside the mobile object A and the relay unit 3 in the mobile object A.

Referring to FIG. 8, when the radio network controller 4 recognizes the necessity of assessing the capacity of the downlink between the relay unit 3 and the radio base station 2-1, the radio network controller 4 transmits a downlink capacity assessment request to the radio base station 2-1 (a1 in FIG. 8). Subsequently, the radio base station 2-1 transfers the downlink capacity assessment request to the relay unit 3. (a2 in FIG. 8).

In response to the request, the relay unit 3 returns the downlink capacity information as a response, which is the result of observation or measurement of the down link capacity. The relay unit 3 may observe or measure the downlink capacity by measuring an error rate on information received from the radio base station 2-1, such as a bit error rate (BER), a frame error rate (FER), a symbol error rate/ratio (SER) and so on or by measuring a signal to noise ratio (SNR), a carrier to interference ratio (CIR) and so on. (a3 in FIG. 8). Subsequently, the radio base station 2-1 transfers the downlink capacity information to the radio network controller 4 (a4 in FIG. 8).

Figure 9:
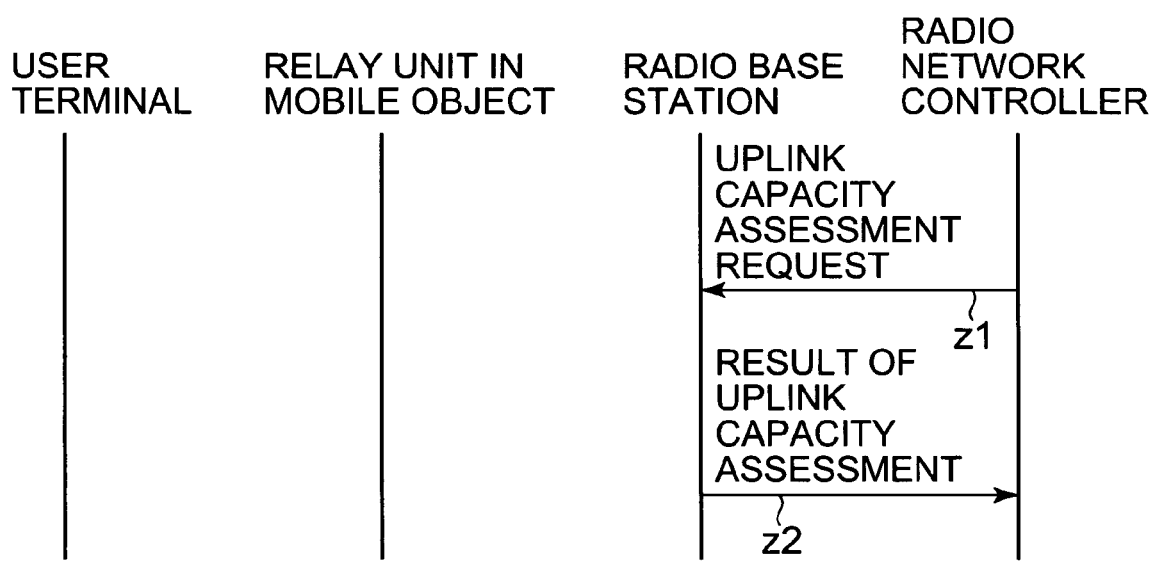
FIG. 9 is a sequence chart showing operations to be performed in the mobile communication system in accordance with the first exemplary embodiment.

FIG. 9 shows a sequence of assessing the uplink capacity between the radio base station 2-1 outside the mobile object A and the relay unit 3 in the mobile object A.

Referring to FIG. 9, when the radio network controller 4 recognizes the necessity of assessing the capacity of the uplink between the relay unit 3 and the radio base station 2-1, the radio network controller 4 transmits a uplink capacity assessment request to the radio base station 2-1 (z1 in FIG. 9). In response to the request, the radio base station 2-1 returns the uplink capacity information as a response, which is the result of observation or measurement of the uplink capacity. The relay unit 3 may observe or measure the uplink capacity by measuring an error rate on information received from the relay unit 3, such as a bit error rate (BER), a frame error rate (FER), a symbol error rate/ratio (SER) and so on or by measuring a signal to noise ratio (SNR), a carrier to interference ratio (CIR) and so on (z2 in FIG. 9).

The radio network controller 4 analyzes the contents of the response returned from the radio base station 2-1 or the relay unit 3. The radio network controller 4 then determines based on the uplink capacity information and the downlink capacity information whether an uplink information rate and a downlink information rate for the communication between each of the user terminals 1-1 and 1-2 and the core equipment 5 should be decreased in the same manner as described with respect FIG. 7.

Figure 10:
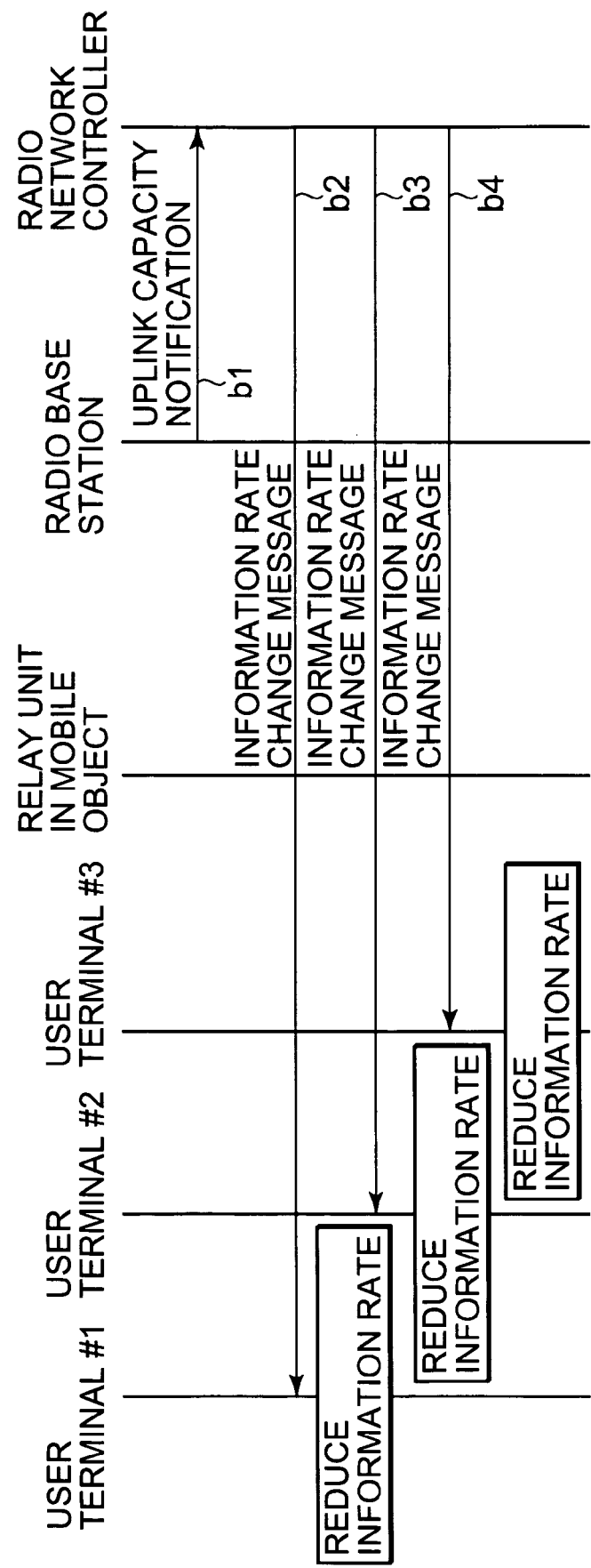
FIG. 10 is a sequence chart showing operations to be performed in the mobile communication system in accordance with the first exemplary embodiment.

FIG. 10 is a sequence chart indicating an exemplary operation of changing information rates in the mobile communication system in accordance with the first embodiment. FIG. 10 shows a sequence of instructing relevant user terminals #1 to #3 (including user terminal 1-1 and 1-2) to change their information rates in a situation where the radio base station 2-1 outside the mobile object A sends a uplink capacity information notifying of a decrease in the uplink capacity. The user terminals #1 to #3 exist in the mobile object A.

Referring to FIG. 10, the radio network controller 4 receives the uplink capacity information from the radio base station 2-1, and recognizes the necessity of decreasing information transfer rates for communication between the user terminals #1 to #3 and the core equipment 5 (b1 in FIG. 10). The radio network controller 4 then transmits information rate change messages to the user terminals #1 to #3 (b2 to b4 in FIG. 10). In response to the information rate change messages, the user terminals #1 to #3 reduces the information rate for the information to be transmitted to the core equipment 5.

Figure 11:
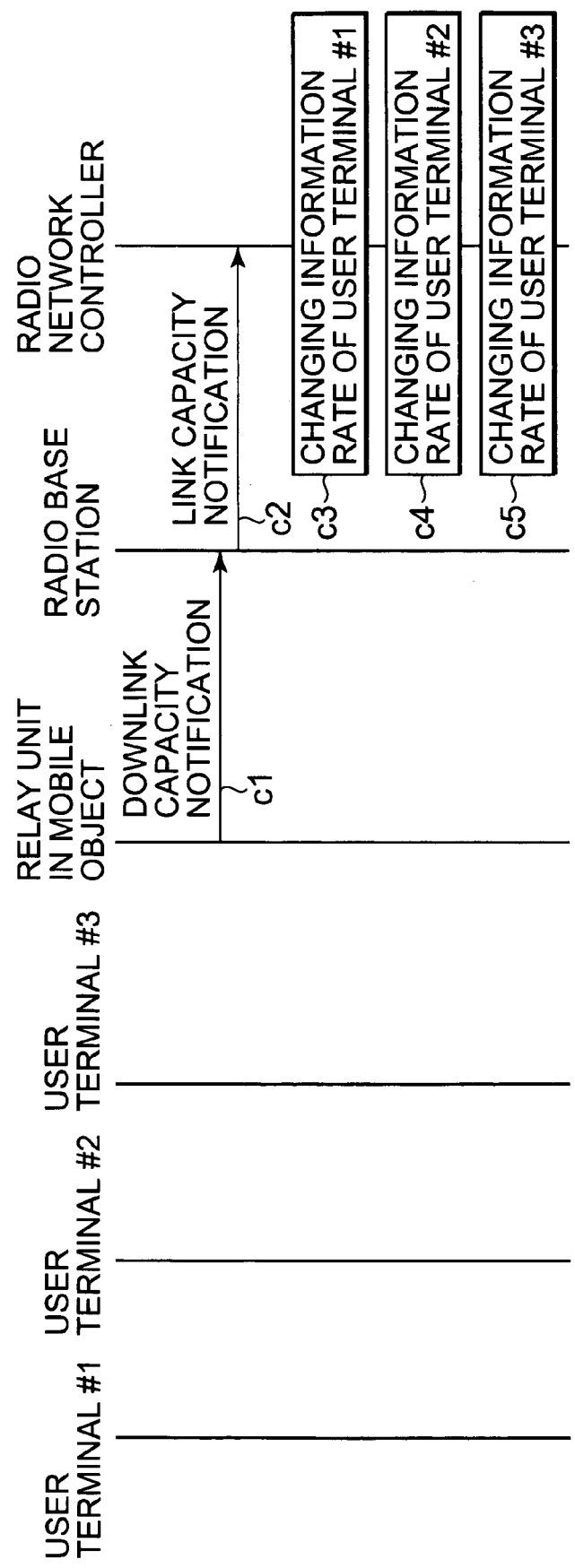
FIG. 11 is a sequence chart showing operations to be performed in the mobile communication system in accordance with the first exemplary embodiment.

FIG. 11 is a sequence chart indicating another exemplary operation of changing information rates in the mobile communication system in accordance with the first embodiment. FIG. 11 shows a sequence of instructing the core equipment 5 to change information rates for the information transmitted to the user terminals #1 to #3 in a situation where the relay unit 3 in the mobile object A sends to the radio network controller 4 downlink capacity information notifying of a decrease in the downlink capacity.

Referring to FIG. 11, the radio network controller 4 receives the downlink capacity information from the relay unit 3. If the radio network controller 4 recognizes the necessity of decreasing the downlink information rates for the communication between the user terminals #1 to #3 and the core equipment 5 (c1 and c2 in FIG. 11), the radio network controller 4 instructs a coder/decoder 51 included in the core equipment 5 to change downlink information rates (c3 to c5 in FIG. 11).

Figure 12:
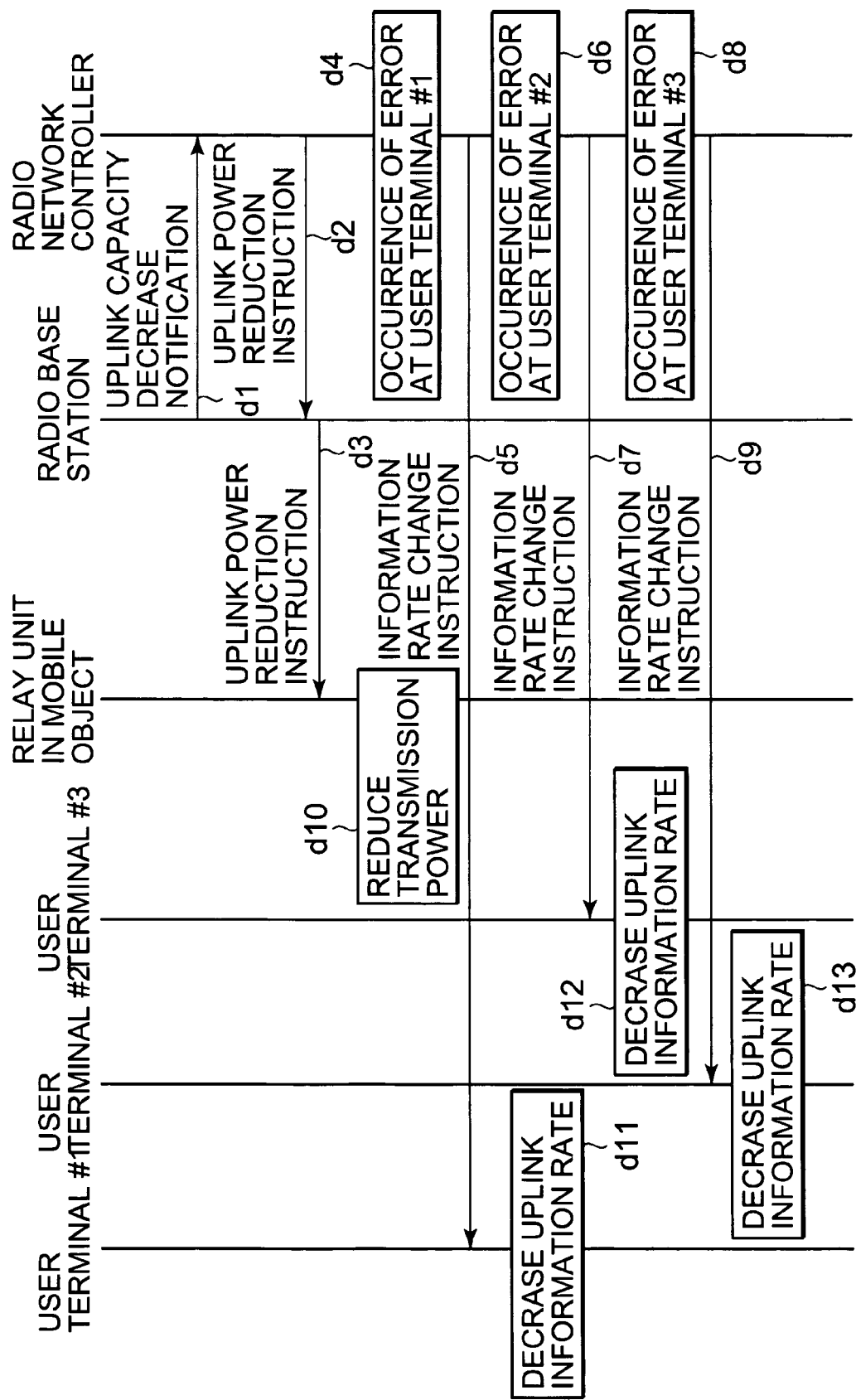
FIG. 12 is a sequence chart showing operations to be performed in the mobile communication system in accordance with a second exemplary embodiment.

FIG. 12 is a sequence chart of a mobile communication system according to a second exemplary embodiment in which a information rate control is activated following a transmission power control. FIG. 12 shows an operation of the second exemplary embodiment in a situation where the radio network controller 4 receives a uplink capacity information notifying of a decrease in a radio uplink capacity.

Assuming that the radio base station 2-1 outside the mobile object A detects a shortage in an uplink capacity (d1 in FIG. 12) or that the radio network controller 4 detects the shortage in the uplink capacity (not shown), the radio network controller 4 transmits an uplink transmission power reduction instruction to the relay unit 3 via the radio base station 2-1 (d2 and d3 in FIG. 12). In response to the uplink transmission power reduction instruction, the relay unit reduces transmission power for wireless signals to be transmitted to the radio base station 2-1 (d10 in FIG. 12). Consequently, an error occurs in information transmitted from the user terminals # 1 to #3 to the core equipment 5.

If the coder/decoder 51 included in the core equipment 5 or an error-in-transferred information detecting feature (not shown) detects an error information transmitted from the user terminals #1 to #3 (d4, d6, and d8 in FIG. 12), the radio network controller instructs the user terminals #1 to #3 to decrease their information rates (d5, d7, and d9 in FIG. 12). In response to the instruction, the user terminal #1 to #3 decrease the uplink information rate for the information transmitted from the user terminal #1 to #3 (d11 to d12 in FIG. 12).

The quality of information received by any of the user terminals #1 to #3 does not recover until the error rate in the information transferred from the user terminals becomes equal to or smaller than a given value.

The user terminals #1 to #3 are instructed independently of each other responsively to occurrence of an error in respective information transmitted from the user terminals. Therefore, if an error is detected in information transmitted from the user terminal #1, the information rate of the user terminal #1 is decreased. However, even if an error was detected in information transmitted from the user terminal #2 or #3, the information rate of the user terminal #2 or #3 may not be decreased.

For example, in a situation where errors are detected as to information transmitted from all the user terminal # 1 to #3, and the information rate of the user terminal # 1 is decreased immediately, the amount of information to be transmitted thereafter from the user terminal #1 is limited. If a lack of radio link capacity recovers owing to the decreased information rate of the user terminal #1, the information rate of the user terminals #2 and #3 will not be decreased, although errors were detected in information transmitted from the user terminal #2 and #3. This procedure may provide an unfair treatment of the user terminals.

Namely, one user terminal decreases its information rate because an error first occurs in information transmitted to or from the user terminal. Owing to the sacrifice made by the user terminal, the other user terminal that has taken no measures against an error need not to decrease its information rate. Consequently, the user terminal that has taken no measures reaps the benefit of high information quality. The foregoing sequences are a mere example but may be different from actual methods.

Figure 13:
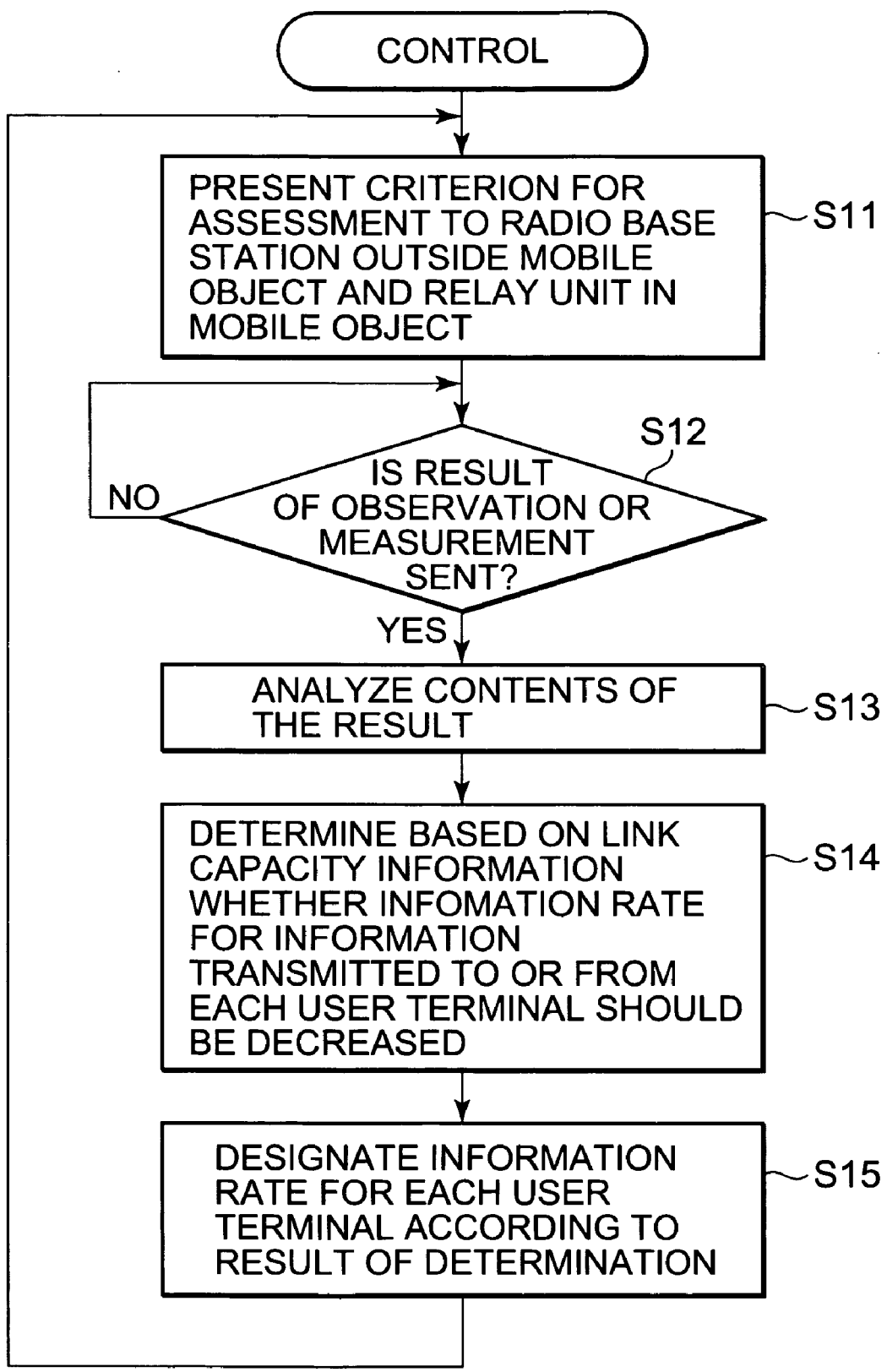
FIG. 13 is a flowchart describing operations to be performed by the radio network controller in a third exemplary embodiment.

FIG. 13 is a flowchart describing operations to be performed by the radio network controller according to a third exemplary embodiment. The configuration of a mobile communication system in accordance with the third exemplary embodiment is identical to that of the mobile communication system in accordance with the first exemplary embodiment shown in FIG. 1. The configuration of the radio network controller included in the third embodiment is identical to that of the radio network controller 4 included in the first exemplary embodiment shown in FIG. 6, except that the link capacity acquisition portion 41 is configured to send criterions for an assessment of link capacity to at least one of the base station 2-1 or the relay base station 3 via the transceiver 45. Referring to FIG. 1, FIG. 6, and FIG. 13, the operation s to be performed by the radio network controller 4 included in the present embodiment will be described below. Here, the operation described in FIG. 13 is obtained by the CPU that runs a program stored in the storage portion 44.

The radio network controller 4 sends in advance the criterions for assessment to the radio base station 2-1 outside the mobile object A and the relay unit 3 in the mobile object A (step S11 in FIG. 13). The criterions may be set in the radio base station 2-1 and the relay unit 3 in advance rather than sent from the radio network controller 4.

When a condition meets the criteria, the radio base station 2-1 and/or the relay unit 3 decide that it is necessary to generate link capacity information. Subsequently, the radio base station and/or the radio base station 3 sends to the radio network controller 4 link capacity information that is a result of observation or measurement of the link capacity. The criteria may be a signal to noise ratio (SNR), a carrier to interference ratio (CIR), a symbol error rate/ratio (SER), a bit error rate (BER), a frame error rate/ratio (FER) and so on. Accordingly, the radio base station 2-1 and/or the relay unit 3 may decide that it is necessary to generate link capacity information when the error described above exceeds the criterion or when the ratio descried above becomes lower than the criterion. Furthermore, the radio base station 2-1 and/or the relay unit 3 may always generate the link capacity information and may send the link capacity information when a condition meets the criterion.

Upon receipt of the link capacity information as a result of observation or measurement sent from the radio base station 2-1 or the relay unit 3 (step S12 in FIG. 13), the radio network controller 4 analyzes the contents of the link capacity information (step S13 in FIG. 13). The radio network controller 4 determines based on the link capacity whether an information rates for the information transmitted to or from each of the user terminals 1-1 and 1-2 should be decreased (step S14 in FIG. 13). The radio network controller 4 designates the information rate for each of the user terminals 1-1 and 1-2 according to the result of the determination (step S15 in FIG. 13). Here, the steps S12 to S15 in FIG. 13 may be identical with the steps S3 to S6 in FIG. 7.

Figure 14:
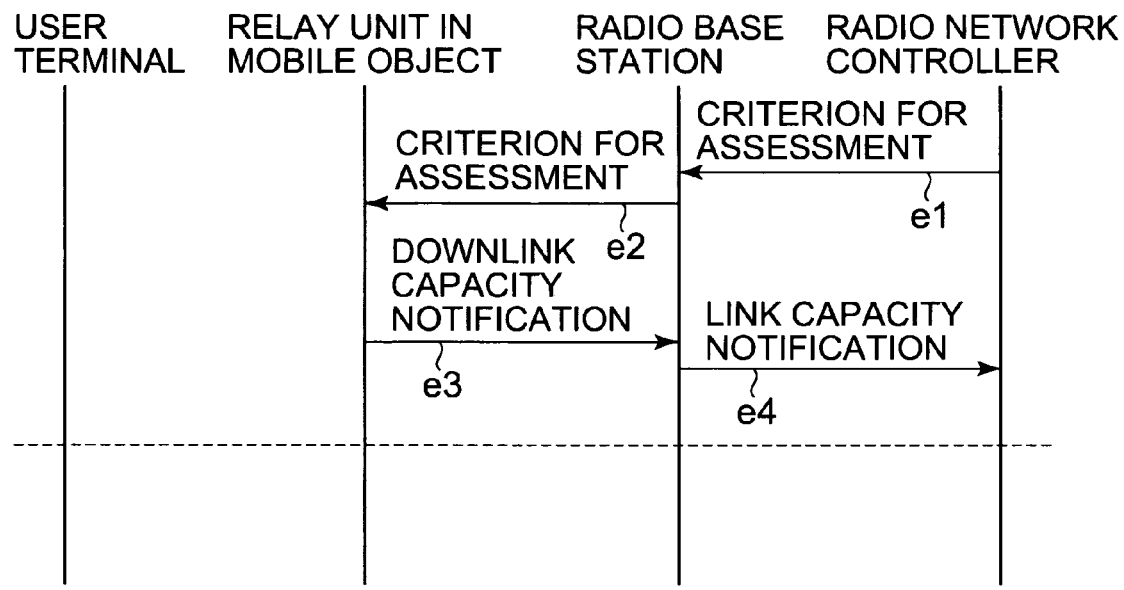
FIG. 14 is a sequence chart showing operations to be performed in the mobile communication system in accordance with the third exemplary embodiment.

FIG. 14 is a sequence chart indicating operations to be performed in a mobile communication system in accordance with the third exemplary embodiment. FIG. 14 shows a sequence of assessing the downlink between the radio base station 2-1 outside the mobile object A and the relay unit 3 in the mobile object A.

Referring to FIG. 14, similarly to FIG. 8, the relay unit 3 assesses the downlink capacity.

However, the radio network controller 4 does not sends the downlink capacity assessment request or a request for downlink capacity information, but sends, in advance, the criterion for assessment to the relay unit 3 via the radio base station 2-1. (e1 and e2 in FIG. 14) When a condition meets the criterion, the relay unit 3 sends the downlink capacity information to the radio network controller 4 via the radio base station 2-1. (e3 to e5 in FIG. 14). Namely, in this case, the relay unit 3 voluntarily sends the link capacity information to the radio network controller when a condition meets the criterion.

Figure 15:
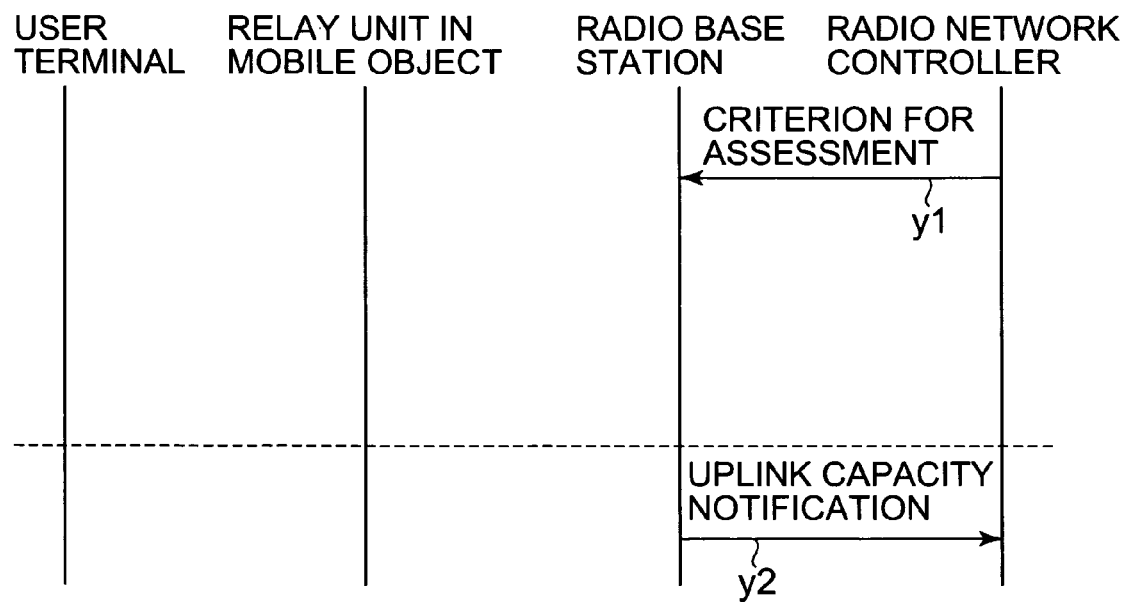
FIG. 15 is a sequence chart showing operations to be performed in the mobile communication system in accordance with the third exemplary embodiment.

FIG. 15 shows a sequence of assessing the uplink between the radio base station 2-1 and the relay unit 3. Referring to FIG. 15, similarly to FIG. 9, the radio base station 2-1 assesses the uplink capacity.

However, the radio network controller 4 does not sends the uplink capacity assessment request or a request for uplink capacity information, but sends, in advance, the criterion for assessment to the radio base station 2-1. (y1 in FIG. 15) When a condition meets the criterion, the radio base station 2-1 sends the downlink capacity information to the radio network controller 4. (y2 in FIG. 15). Namely, in this case, the radio base station 2-1 voluntarily sends the link capacity information to the radio network controller when a condition meets the criterion.

Figure 16:
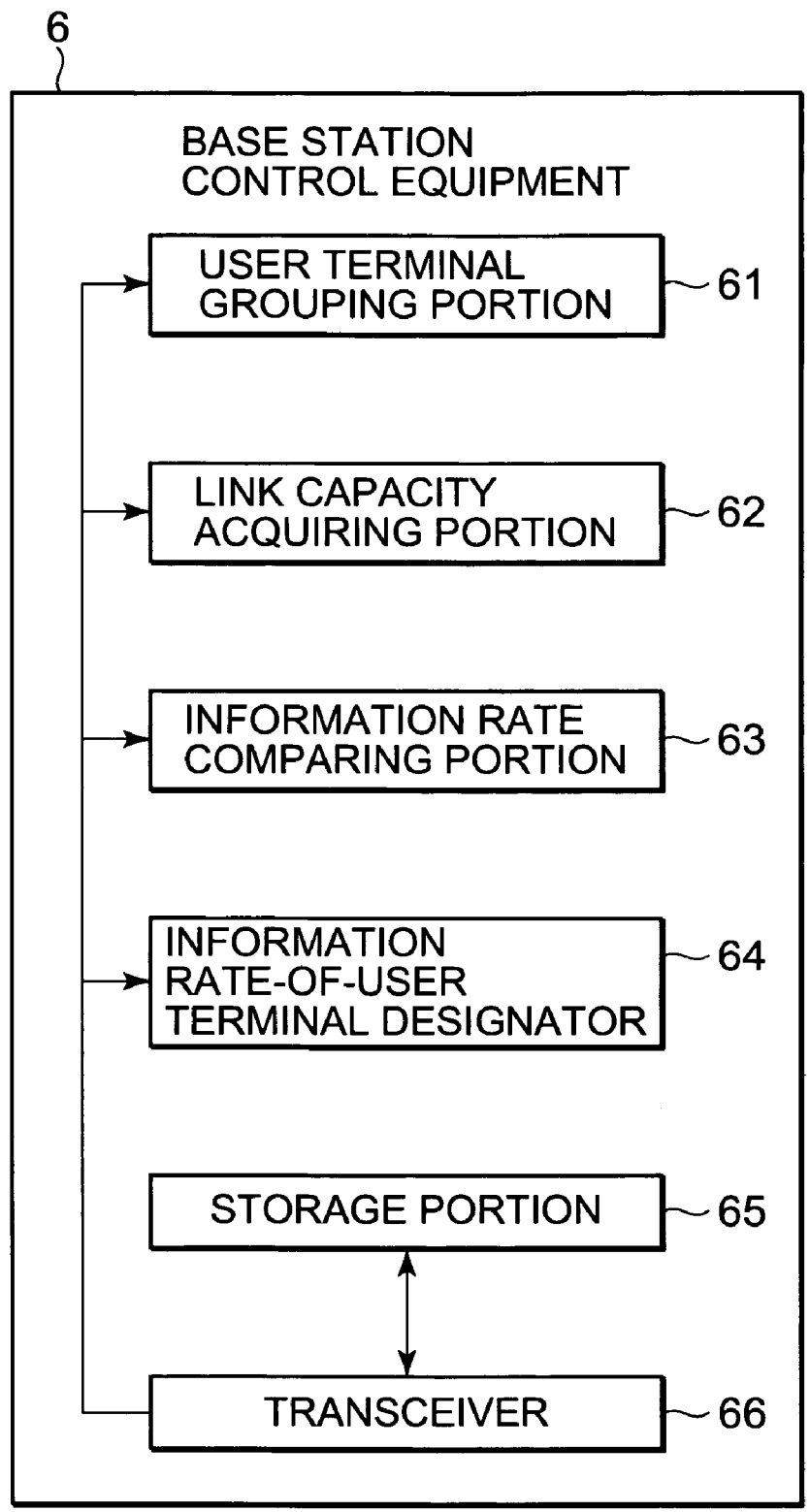
FIG. 16 shows a structure of a radio network controller in a fourth embodiment.

FIG. 16 is a block diagram showing the structure of a radio network controller 6 included in fourth exemplary embodiment. According to the fourth exemplary embodiment, the configuration of a mobile communication system is identical to that of the mobile communication system in accordance with the first, second and third exemplary embodiments shown in FIG. 1, except that the radio network controller 6 substitutes for the radio network controller 4. Referring to FIG. 16, the radio network controller 6 comprises a user terminal grouping portion 61, a link capacity acquiring portion 62, an information rate comparing portion 63, an information rate designator 64, and a storage portion 65 and a transceiver 66.

The transceiver 66 is configured to transmits signal to the base station 2-1 and to receives signals from the base station 2-1. Also, the transceiver 66 is configured to transmits signals to the core equipment 5 and receives signals from the core equipment 5. The user terminal grouping portion 61 is configured to divide the user terminals (including 1-1 and 1-2) into groups. The link capacity acquiring portion 62 acquires uplink capacity from the radio base station 2-1 and acquires downlink capacity from the replay radio base station 3.

The information rate comparing portion 63 is configured to compare an current information rate for information transmitted from or to the user terminal 1-1 or 1-2 via the relay unit 3 with an available information rate based on the radio link capacity.

The information rate designator 64 is configured to instruct the user terminals 1-1 and 1-2 to decrease their information rates, if the result of the comparison demonstrates that the information rate based on the radio link capacity is lower than the current information rate. If the current information rates for information transmitted to or from the user terminals 1-1 and 1-2 become lower than the information rate based on the radio link capacity because of a change in a radio-wave propagation condition or a reduction in traffic, the instruction that the user terminals 1-1 and 1-2 should decrease their information rates is canceled or the information rate-of-user terminal designator 64 instructs the user terminals 1-1 and 1-2 to increase the information rates.

The radio network controller 6 is a computer comprising at least a central processing unit (CPU) (not shown) and a RAM (not shown) offering a work area for calculation. Programs to be loaded into the RAM and run by the CPU are stored in the storage portion 65.

Figure 17:
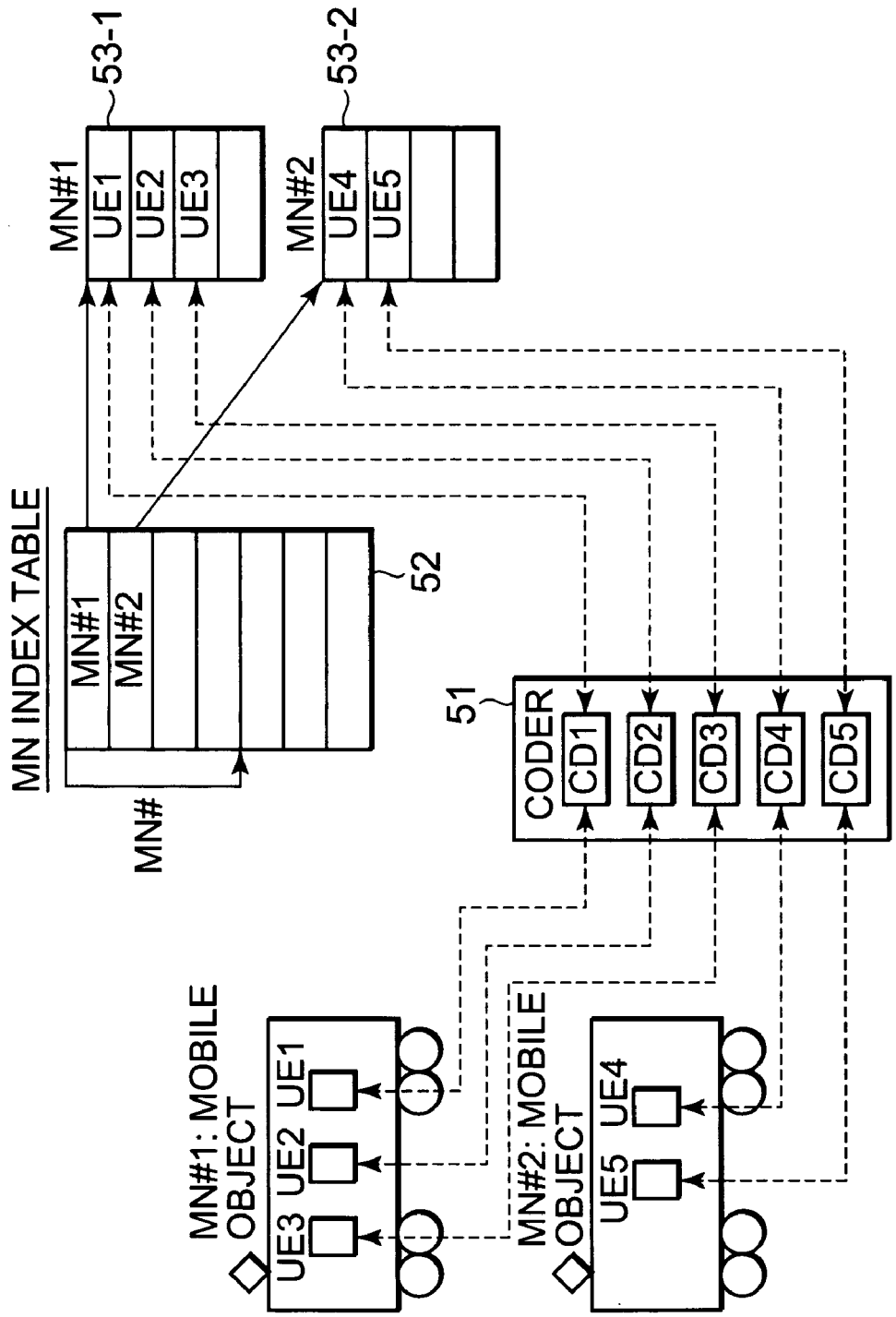
FIG. 17 shows associations between user terminals in a mobile object and a coder/decoder.

FIG. 17 shows the relationship between the user terminals UE 1 to UE 5 (including 1-1 and 1-2) in the mobile object A according to the forth embodiment of the present invention and coder/decoders for encoding information destined for the respective user terminals, and states of memories associated with user terminals in a mobile object MN#1 and a mobile object MN#2 in the mobile communication system.

Referring to FIG. 17, a voice service to be provided using a voice coder/decoder will be described as an example. As explained in reference to FIG. 1, the core equipment 5 comprises the coder/decoder 51. The coder/decoder 51 comprises coder/decoders CD 1 to CD 5 that produces an encoded audio signal destined for respective terminals UE1 to UE5 and decodes the encoded audio signal received from the respective user terminals UE1 to UE5 providing a verbal speech service to the user terminals UE1 to UE5. Similarly, the user terminals UE1 to UE5 or their accessories comprise a coder/decoders that is configured to produce an encoded audio signal destined for the core equipment 5 and decodes the encoded audio signal received from the core equipment 5. In FIG. 17, dashed-line arrows indicate associations between the coder/decoder 51 included in the core equipment 5 and the coder/decoders in the user terminals UE1 to UE5.

A MN index table 52 comprises information 53-1 and 53-2 showing association between the mobile objects (MN1 and MN 2) and the user terminals (UE1 to UE5). That is the MN index shows which mobile object each of the user terminal UE1 to UE5 exists in. In FIG. 17, three user terminals UE1 to UE3 exist in the mobile object MN#1, and two user terminals UE4 and UE5 exist in the mobile object MN#2. The MN index 52 may be included in the user terminal grouping portion 61 in the radio network controller 4.

It is assumed that the information rates for the user terminals UE1 to UE3 in the mobile object MN#1 cannot be maintained because of a decrease in a capacity of a radio link between the mobile object MN#1 and the radio base station 2-1.

In this case, the radio network controller 6 recognizes that the link capacity for the mobile object MN#1 is decreased rather than MN #2, and then refers to index tables 52 so as to find the user terminals in the mobile object MN#1. Accordingly, the radio network controller finds the user terminals UE1 to UE3 in the index table 52 (53-1) as user terminals in the mobile object MN 1, and decreases the information rates for information transferred from the coder/decoders CD1 to CD3 in the coder/decoder 51. Also, the coder/decoders (not shown) included in the user terminals UE1 to UE3 are modified to reduce the information rates.

Similarly, in a situation where a capacity of a radio link for the mobile object MN#2 is decreased, the radio network controller 6 recognizes that the link capacity for the mobile object MN#2 is decreased rather than MN #1, and then refers to index tables 52 so as to find the user terminals in the mobile object MN#2. Accordingly, the radio network controller finds the user terminals UE 4 and UE 5 in the index table 52 (53-2) as user terminals in the mobile object MN 2, and decreases the information rates for information transferred from the coder/decoders CD 4 and CD 5 in the coder/decoder 51. Also, the coder/decoders (not shown) included in the user terminals UE 4 and UE 5 are modified to reduce the information rates.

In a situation where both link capacities for the mobile objects MN#1 and MN#2 are decreased, the radio network controller 6 refers to the index tables 52, 53-1, and 53-2 to find the user terminals in the mobile object MN 1 and MN 2. Accordingly, the radio network controller 6 finds the user terminal UE1 to UE5 in the index table 52 (53-1 and 53-2) as user terminals in the mobile object MN 1 and MN 2, and then decreases the information rates for information transmitted to or from the user terminals UE1 to UE5 at the same time. Following the information rate control, if necessary, a transmission power for the radio link between both the mobile objects MN#1 and MN#2 and the radio base station 2-1 outside the mobile objects is decreased. Consequently, the radio link capacities are recovered.

In this exemplary embodiment; the information rate may be changed as described with respect to the first embodiment. Furthermore, user terminals outside the mobile objects may also be grouped in the index 52.

Figure 18:
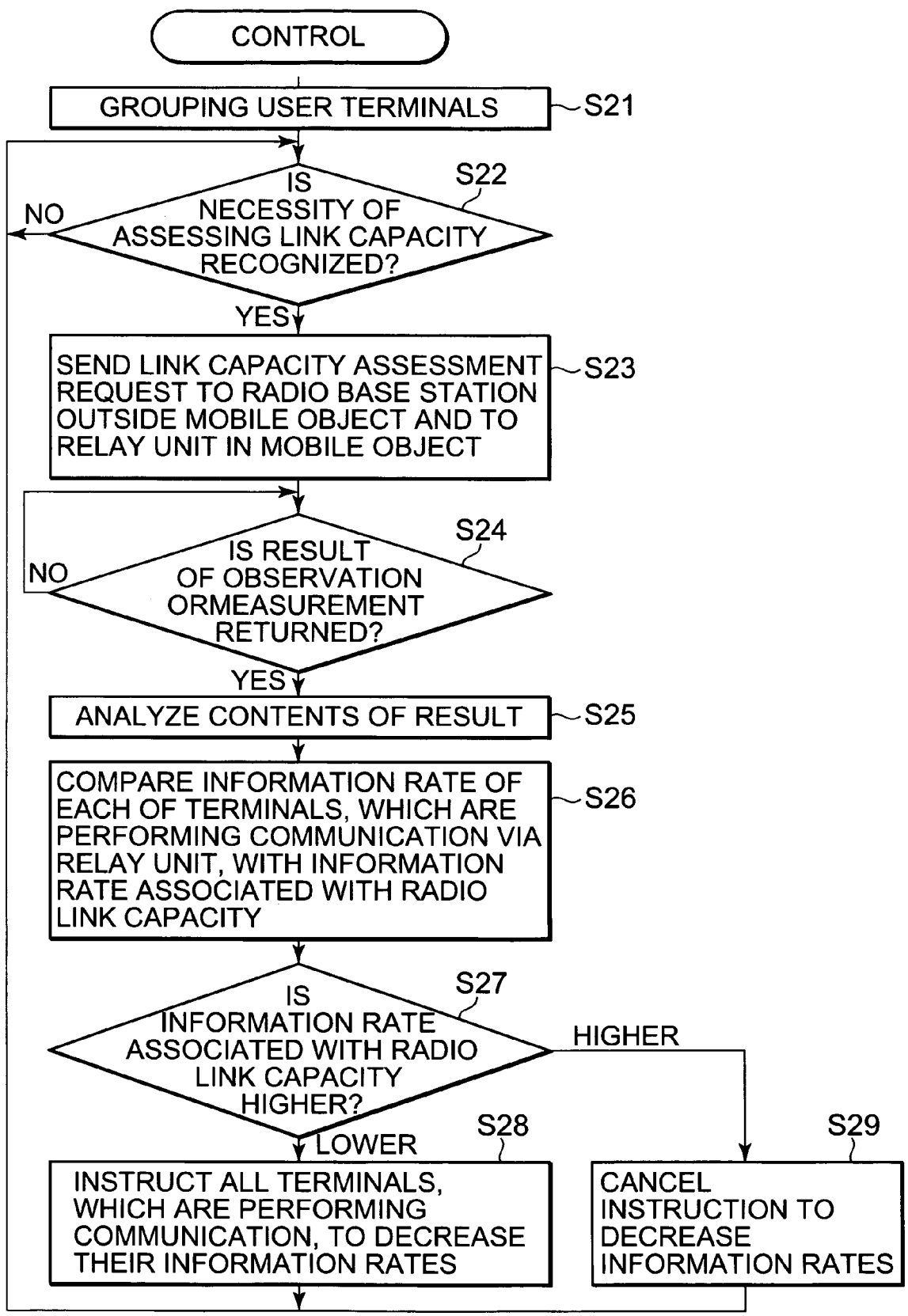
FIG. 18 shows a flowchart describing operations to be performed by the radio network controller shown in FIG. 16.

FIG. 18 is a flowchart describing operations to be performed by the radio network controller 6 shown in FIG. 16. Referring to FIG. 1, FIG. 16, and FIG. 18, the operations of the radio network controller 6 will be described below. Here, the operations described in FIG. 18 is implemented by a program stored in the storage portion 65 that is run by the CPU.

The radio network controller 6 groups the user terminals 1-1 and 1-2. That is, the radio controller 6 divides the user terminals 1-1 and 1-2 into groups (step S21 in FIG. 18). If the radio network controller 6 recognizes a necessity of assessing a link capacity (step S22 in FIG. 18), the radio network controller 6 sends a link capacity assessment request to the radio base station 2-1 outside the mobile object and to the relay unit 3 in the mobile object (step S23 in FIG. 18).

On receiving the link capacity information as the result of observation or measurement sent as a response from the radio base station 2-1 or the relay unit 3 (step S24 in FIG. 18), the radio network controller 6 analyzes the contents of the link capacity information (step S25 in FIG. 18). The radio network controller 6 compares the current information rates of the user terminals 1-1 and 1-2, which are performing communication via the relay unit 3 in the mobile object, with an available information rate based on the radio link capacity (step S26 in FIG. 18). The radio network controller 6 may receive the link capacity information that is voluntary sent from at least one of the radio base station 2-1 or the relay unit as described with respect to the third embodiment.

If the available information rate associated with the radio link capacity is lower than the current information rate (step S27 in FIG. 18), the radio network controller 6 instructs all the user terminals 1-1 and 1-2 and/or the core equipment 5 to decrease their information transfer rates (step S28 in FIG. 18). On the other hands, if the available information rate is higher than the current information rates (step S27 in FIG. 18), the radio network controller 6 cancels the instruction that the information transfer rates should be decreased or instructs the user terminals 1-1 and 1-2 and/or the core equipment to increase the information rate (step S29 in FIG. 18).

The steps of S22, S23, S24 and S 25 in FIG. 18 are substantially identical with the steps of S1, S2, S3 and S4 in FIG. 7.

According to the fourth exemplary embodiment, the radio network controller 6 may separately control the information rates of user terminals so that the information rate of each user terminal is determined based on a kind of service that each user terminal enjoys. Furthermore, the radio network controller 6 may divide the user terminals in to groups based on the service.

Figure 19:
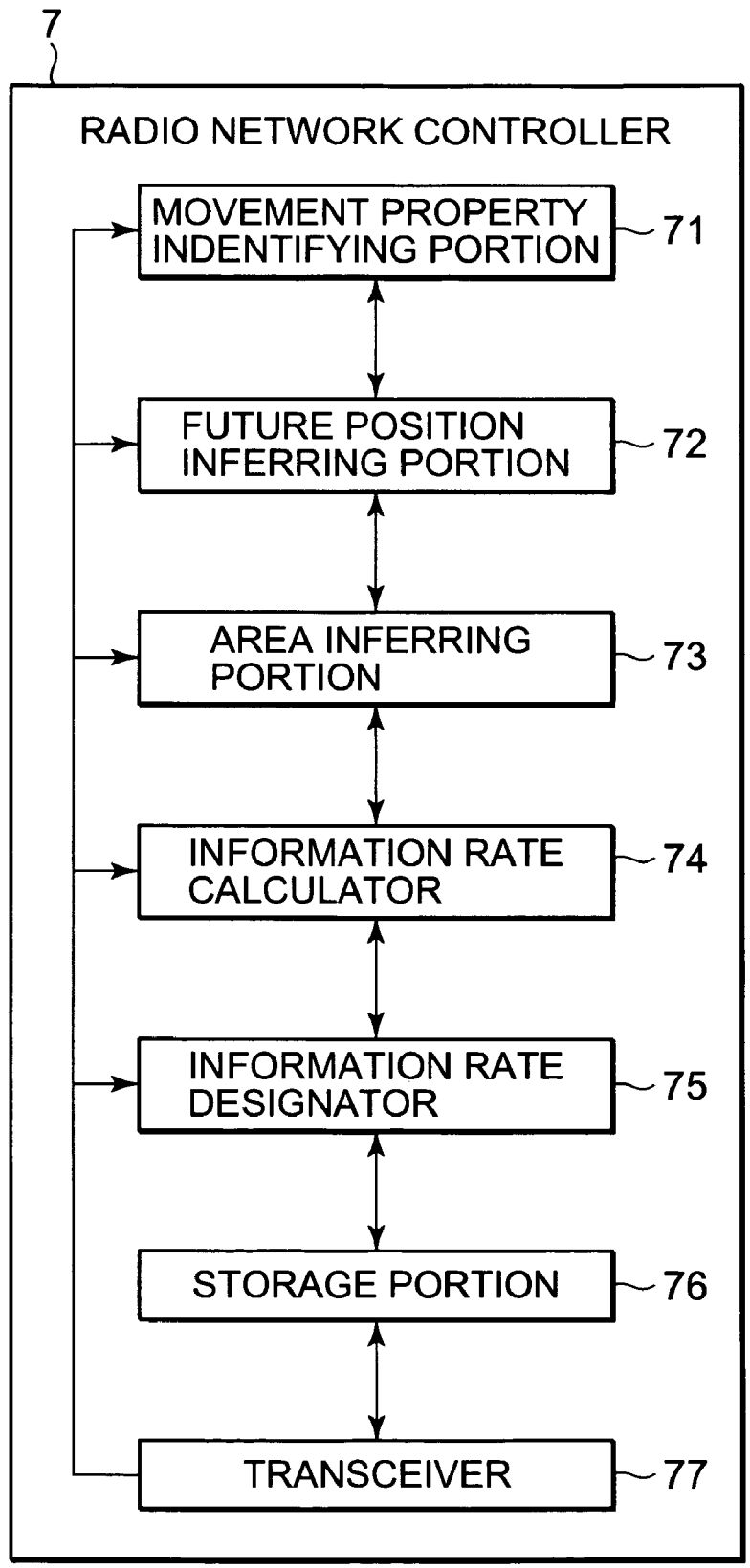
FIG. 19 shows a structure of a radio network controller included in a fifth embodiment.

FIG. 19 is a block diagram showing a structure of a radio network controller 7 included in a fifth exemplary embodiment. Referring to FIG. 19, the radio network controller 7 comprises a movement property identifying portion 71, a future position inferring portion 72, an area inferring portion 73, an information rate calculator 74, an information rate designator 75, storage portion 76 and a transceiver 77. The configuration of a mobile communication system in accordance with the fifth exemplary embodiment is identical to that of the mobile communication system in accordance with the first exemplary embodiment shown in FIG. 1, except that the radio network controller 7 substitutes the radio network controller 4. Moreover, in the present exemplary embodiment, the mobile communication system is adapted to a case where the mobile object A is navigated along a laid track such as a railway track.

The transceiver 77 is configured to transmits signals to the base station 2-1 and to receives signals from the base station 2-1. Also, the transceiver 77 is configured to transmits signals to the core equipment 5 and receives signals from the core equipment 5. The movement identifying portion 71 is configured to identify the movement-related property of the mobile object A that is navigated along a laid track such as a railway track. The future position inferring portion 72 is configured to infer a prospective (future) position of the mobile object A from the movement-related property of the mobile object A identified by the movement property identifying portion 71. The area inferring portion 73 is configured to infer a radio base station area at the prospective (future) position of the mobile object A inferred by the future position inferring portion 72.

The information rate calculator 74 is configured to calculate an available information rate from the capacity of a link for the radio base station 2-1 or other radio base station outside the mobile object A, which covers the prospective radio base station area inferred by the radio base station area inferring means 73. The information rate designator 75 is configured to designate the information rates of the respective user terminals 1-1 and 1-2, which are performing communication via the relay unit 3 in the mobile object A, so that the sum of the information rates does not exceed the available information rate calculated by the information rate calculator 74, after the mobile object A enters the radio base station area inferred by the radio base station area inferring means 73. The information rates may be designated or controlled on or before the mobile object A moves into the prospective radio base station area.

The radio network controller 7 includes a computer comprising at least a central processing unit (CPU) (not shown) and a RAM (not shown) providing a work area. Programs to be loaded into the RAM and run by the CPU are stored in the storage portion 76.

Figure 20:
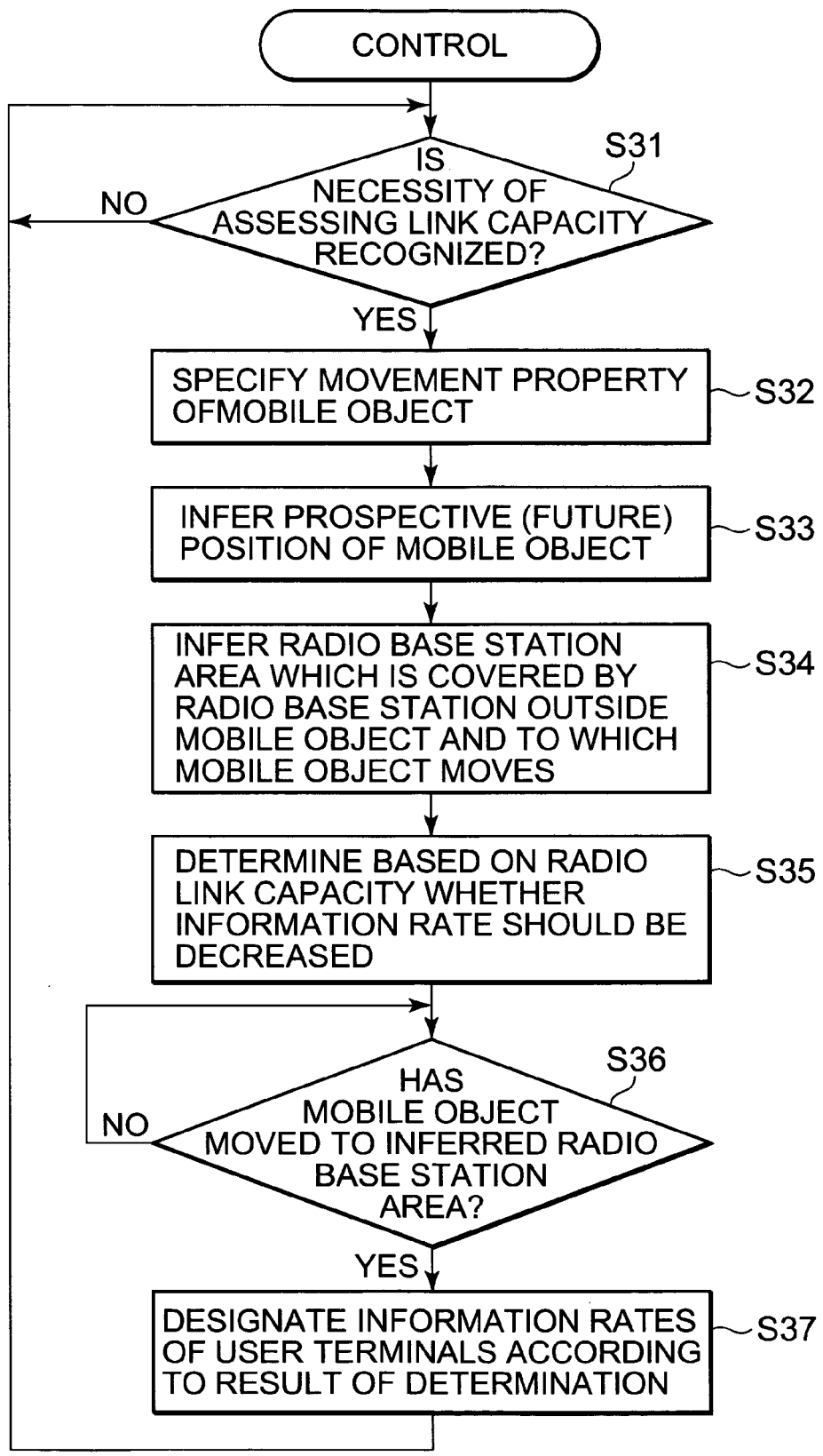
FIG. 20 shows a flowchart describing the operations to be performed by the radio network controller shown in FIG. 19.
Figure 21:
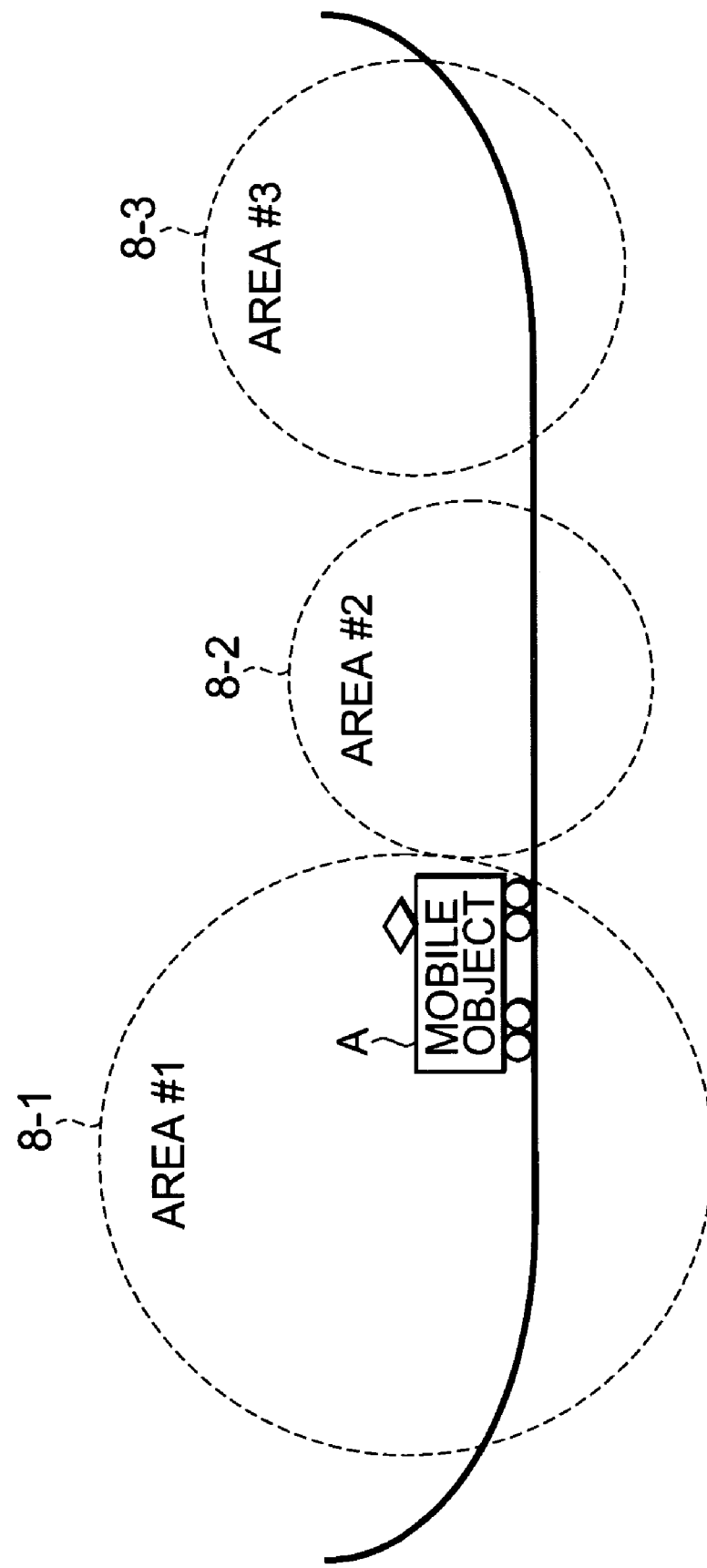
FIG. 21 shows a mobile object that is included in the fifth embodiment of the present invention and that is navigated along a laid track such as a railway track.
Figure 22:
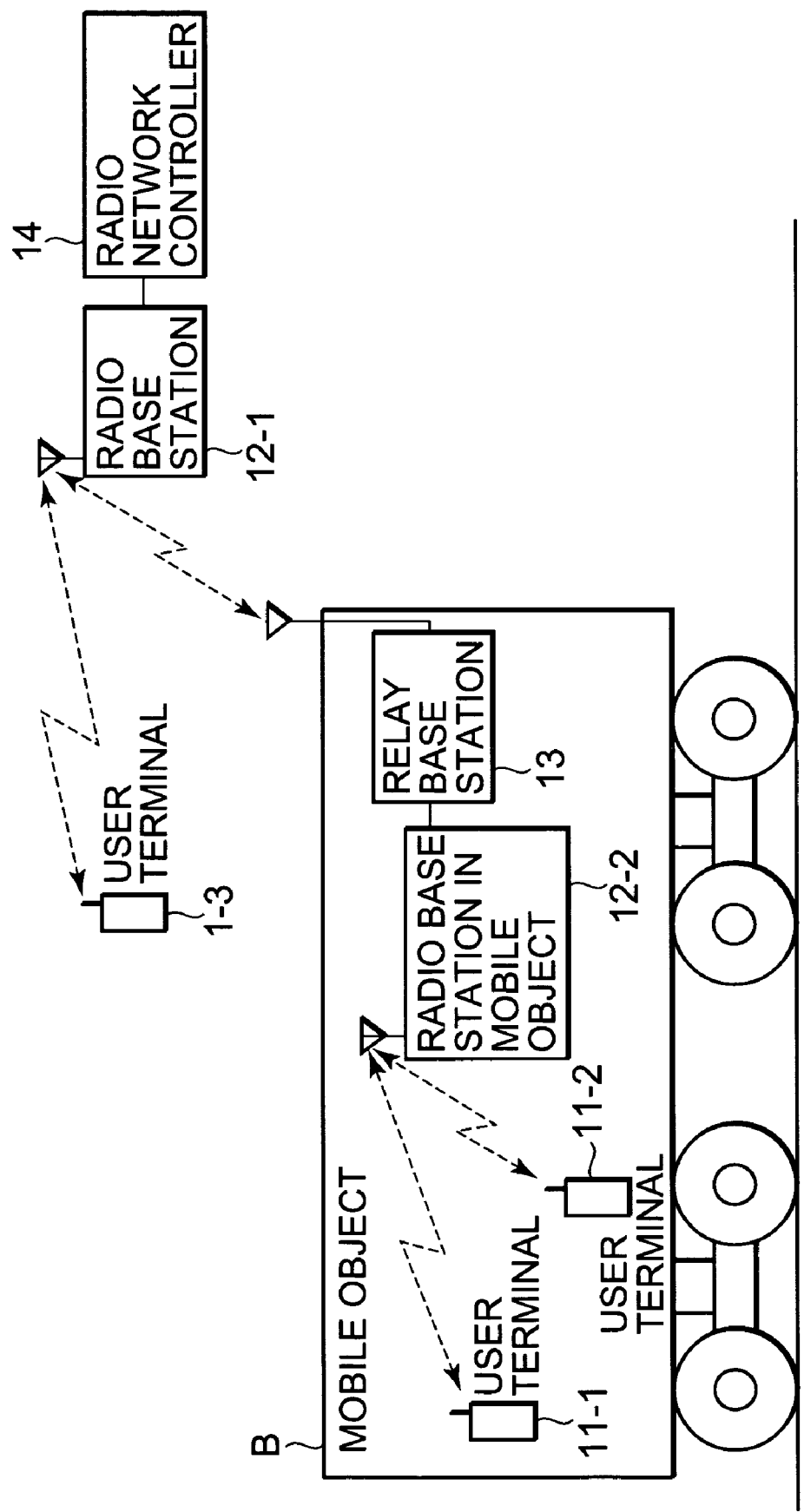
FIG. 22 shows a configuration of a mobile communication system in accordance with a related art.

FIG. 20 is a flowchart describing operations to be performed by the radio network controller 7 shown in FIG. 19. FIG. 21 shows the mobile object A that is navigated along a laid track such as a railway track according to the fifth exemplary embodiment. Referring to FIG. 1 and FIG. 19 to FIG. 21, the operations of the base radio network controller 7 will be described below. The operation described in FIG. 20 is implemented by a program, which is run by the CPU, stored in the storage portion 76.

If the radio network controller 7 recognizes the necessity of assessing the capacity of a link as to the relay unit 3 in the mobile object A (step S31 in FIG. 20), the radio network controller 7 identifies the movement-related property of the mobile object A. The movement-related property may be a moving speed or may be grasped based on a schedule or a timetable in a case where the mobile object A belongs to a traffic system, such as a train system or a bus system. (step S32 in FIG. 20).

Thereafter, the radio network controller 7 infers the prospective (future) position of the mobile object A on the basis of the movement-related property of the mobile object A (step S33 in FIG. 20), and infers a prospective radio base station area covered by the radio base station 2-1 or other radio base station (a prospective radio base station) outside the mobile object A to which the mobile object A would move (i.e., a radio base station area to be employed next) (step S34 in FIG. 20).

The radio network controller 7 determines based on the radio link capacity in the inferred prospective radio base station area (e.g., the radio link capacity in the radio base station area measured in advance) whether the current information rates for the respective user terminals 1-1 and 1-2 transfer information should be decreased. The radio network controller 7 may acquire link capacity information from the prospective base station. The decision whether information rate should be decreased is made in the same manner as described with respective to either the first, second, third or fourth exemplary embodiment (step S35 in FIG. 20).

After the mobile object A moves to the inferred prospective radio base station area (step S36 in FIG. 20), the radio network controller 7 designates or controls the information rates of the user terminals 1-1 and 1-2 according to the result of the determination (step S37 in FIG. 20). The information rates may be designated or controlled on or before the mobile object A moves into the prospective radio base station area. The designation and control of the information rates may be performed in the same manner as described with respect to either the first, second, third or fourth exemplary embodiment.

Referring to FIG. 21, the operation to be performed in a situation where the mobile object A is navigated along a laid track such as a railway track will be described below. FIG. 20 shows that the mobile object A moves to pass through a plurality of areas area #1 (8-1), area #2 (8-2), and area #3 (8-3) that are covered by the radio base station 1-2 or other radio base station included in the mobile communication system.

As the mobile object A is, as shown in FIG. 20, navigated along a laid track, a trajectory of the movement of the mobile object A is determined, in advance, based on a railroad. The radio network controller 7 may infer the position of the mobile object A at a certain time instant from a current point where the mobile object. A located, a current time, and a moving direction thereof.

Assume that it is recognized that the mobile object A located in area #1 (8-1) moves toward area #2 (8-2) and area #3 (8-3) along the laid track shown in FIG. 21. That is, it is assumed that the movement-related property of the mobile object A is specified. For example, a position recognizing means or feature that recognizes a relative position in an area and that is included in a radio base station which covers the area #1 (8-1) may be used to recognize or check whether the mobile object is moving toward area #2 and area #3. Alternatively, a diagram of a railway system may be referred in order to specify the movement related property of the mobile object A. In this case, the position recognizing means included in the radio base station recognizes or checks the movement-related property of the mobile object A by using the diagram of the railway system.

For example, if the radio link capacity in area #2 (8-2) is lower than that in area #1 (8-1), the information rates of the user terminals 1-1 and 1-2 in the mobile object A may be set to appropriate values, before the mobile object A actually enters area #2 (8-2).

Consequently, the information rate for information transferred between the mobile object A and the radio base station 2-1 or other radio base station outside the mobile object A can be determined more quickly and more effectively than they are determined by assessing a radio link capacity after the mobile object enters a new area. Moreover, the transmission power on the radio link between the mobile object A and the prospective radio base station 2-1 or other radio base station can be controlled beforehand. Accordingly, a phenomenon in that the radio link capacity in the new area temporally decreases can be avoided.

The mobile communication system in accordance with the present invention can be adapted to other mobile objects in a traffic system whose movement-related properties can be estimated, such as, a route bus, a marine vessel, and an airplane that enter service regularly. As for the route bus, a small error is likely to occur in the cruising time instants due to a traffic situation. However, the traveling route is predetermined. Whichever of areas the route bus will move into next after leaving a certain area can be inferred. As for the marine vessel, although the moving range of the marine vessel is wider than a range that a normal portable cellular phone system can cover, a route to be followed by the marine vessel can be estimated.

As for the airplane, the moving range is a three-dimensional space, though those of the route bus and marine vessel are a two-dimensional space. However, it is possible to estimate an area, to which the airplane moves, covered by a base station or other equipment that covers the three-dimensional space.

In a situation where the mobile object is airplane, a kind or an attribute of a radio base stations disposed outside the mobile object with which the mobile object communicates would be changed depending on a flight altitude or state of the mobile object.

For example, when the altitude of the airplane is low, a radio base station installed on the ground may be used as a radio base station with which the airplane communicates. When the altitude of the air plane is high, a communication satellite flying in cosmic space may be adopted as the radio base station with which the airplane communicates. The communication satellite flying in the cosmic space may be adopted in a case where a radio base station cannot be installed on the ground for some reasons, such as a geopolitical situation. In such a case, the radio base station with which the mobile object communicates is not installed on a fixed basis but orbits around the Earth. Therefore, a kind or an attributes of the radio base station disposed outside the mobile object, with which a relay unit installed in the mobile object (the airplane) would be changed depending on the flight state of the airplane itself, that is, whether the airplane has not taken off, is cruising at a low altitude after takeoff, is cruising at a high altitude, is cruising at a low altitude in preparation of landing, or has been landed. Furthermore, the kind or the attribute would be changed depending on a region in which the airplane is navigated.

Moreover, Although a movement-related property of a mobile object may not be estimated exactly, in some situations, the movement-related property may be recognized to some extents in connection with an ambient situation. For example, A movement-related property of an automobile (an mobile object), which moves around a region where a dedicated road such as an expressway may be recognized. In the region, the automobile must pass through a branching mechanism such as an interchange or an exit to part from the region and move to an open road. Therefore, in an area where such a mechanism or facility is not provided, a destination area into which the automobile will move may be estimated by recognizing or checking a current position of the automobile and a moving direction thereof. When the capacity of a radio link in the destination area is learned in advance, an information rate and transmission power which are suitable for the situation in the destination area may be determined in advance.

The foregoing procedure is not limited to the dedicated road but may be applied to open road to some extents. Moreover, the mobile object is not limited to objects belonging to a traffic system (service). The present invention may be adapted to a passenger moving means for a private purpose, such as a sightseeing bus or a microbus, as long as the movement-related property of the passenger moving means can be estimated.

A moving range and a direction (the movement-related property) of the mobile object A may be recognized or checked using a feature provided as a constitutional feature of an ordinary mobile communication system. Also, a feature included in a traffic system, such as a diagram, a time schedule, and a route schedule, may be used for recognizing the moving range and the direction (the movement-related property) of the mobile object A. Furthermore, a positioning means, such as, a global positioning system (GPS) or a positioning means disposed in the vicinity of the mobile object A may be used to recognize or check the movement-related property of the mobile object A.

As mentioned so far, according to the embodiments, if a shortage in a radio link capacity occurs on a radio link between the relay unit 3 in a mobile object and the radio base station 2-1 outside the mobile object, the information rates of the respective user terminals 1-1 and 1-2 in the mobile object are set to values associated with the capacity of the radio link between the relay unit 3 in the mobile object and the radio base station 2-1 outside the mobile object. Thus, the information rates or transmission power on the radio link between the relay unit 3 in the mobile object and the radio base station 2-1 outside the mobile object can be quickly adjusted. Moreover, since the information rates of the user terminals 1-1 and 1-2 are designated, a coding rate can be immediately adjusted according to each of the information rates. Compared with a case where the information rates are tentatively adjusted, occurrence of an error in transferred information is more suppressed.

Consequently, information rate or transmission power between a relay unit within a mobile object and a radio base station disposed outside the mobile object can be adjusted quickly. Occurrence of an error in information to be transferred from or to a user terminal can be suppressed.

While the present invention has been particularly illustrated and described with reference to exemplary embodiments thereof, the invention is not limited to these embodiments. It will be understood by those of ordinary skill in the art that various changes in structure, form, and details may be made thereto without departing from the spirit and scope of the present invention as defined by the following claims.

What is claimed is:

1. A radio network controller, comprising:
a controller configured to determine available information rate for communication, via a first base station, between a plurality of terminals and a second base station based on link capacity information for wireless communication between the first base station and the second base station, and to control each of information rates for the communication between the plurality of terminals and the second base station, based on the available information rate, the plurality of terminals and the first base station being in a mobile object, the second base station being outside the mobile object,
wherein the controller receives the link capacity information from at least one of the first base station or the second base station,
wherein the link capacity information comprises uplink capacity information and down link capacity information, the information rates comprise uplink information rates and downlink information rates, the available information rate comprises an available uplink information rate and an available downlink information rate, the controller sends a request for the downlink capacity information to the first base station, receives the downlink capacity information from the first base station, determines the available downlink information rate based on the downlink capacity information and controls the downlink information rates based on the available downlink information rate, and the controller sends a request for the uplink capacity information, receives the uplink capacity information from the second base station, determines the available uplink information rate based on the uplink capacity information and controls the uplink information rates based on the available uplink information rate.

2. A radio network controller, comprising:
a controller configured to determine available information rate for communication, via a first base station, between a plurality of terminals and a second base station based on link capacity information for wireless communication between the first base station and the second base station, and to control each of information rates for the communication between the plurality of terminals and the second base station. based on the available information rate, the plurality of terminals and the first base station being in a mobile object, the second base station being outside the mobile object,
wherein the controller receives the link capacity information from at least one of the first base station or the second base station,
wherein the link capacity information comprise an uplink capacity information and a down link capacity information, the information rates comprise uplink information rates and downlink information rates, the available information rate comprises an available uplink information rate and an available downlink information rate, the controller receives the downlink capacity information from the first base station, determines the available downlink information rate based on the downlink capacity information and controls the downlink information rates based on the available downlink information rate, the downlink capacity information being sent from the first base station when the first base station recognizes, based on a first criterion, that it is necessary to send the downlink capacity information, and the controller receives the uplink capacity information from the second base station, determines the available uplink information rate based on the uplink capacity information and controls the uplink capacity information based on the available uplink information rate, the uplink capacity information being sent from the second base station when the second base station recognizes, based on a second criterion, that it is necessary to send the uplink capacity information.

3. The radio network controller according to claim 2, wherein the controller sends at least one of the first criterion or the second criterion to the first base station or the second base station, respectively.

4. The radio network controller according to claim 2, wherein the first criterion and the second criterion are predetermined values of at least one of a signal to noise ratio, a carrier to interference ratio, a symbol error rate, a bit error rate, or a frame error rate.

5. A method, comprising: providing a plurality of terminals and a first base station in a mobile object, providing a second base station outside the mobile object; and determining available information rate for communication between the plurality of terminals and the second base station based on link capacity information for wireless communication between the first base station and the second base station; and controlling each of information rates for the communication between the plurality of terminals and the second base station based on the available information rate,
receiving the link capacity information from at least one of the first base station or the second base station,
wherein the link capacity information comprises uplink capacity information and down link capacity information, the information rates comprise uplink information rates and downlink information rates, the available information rate comprises an available uplink information rate and an available downlink information rate, the step of receiving the link capacity information comprises, sending a request for the downlink capacity information to the first base station; sending a request for the uplink capacity information to the second base station; receiving the downlink capacity information from the first base station; and receiving the uplink capacity information from the second base station, and the step of determining the available information rate comprises determining the available down information rate based on the downlink capacity information, and determining the available uplink information rate based on the uplink capacity information, and the step of controlling the information rates comprises controlling the downlink information rates based on the available downlink information rate; and controlling the uplink information rates based on the available uplink information rate.

6. A method, comprising: providing a plurality of terminals and a first base station in a mobile object, providing a second base station outside the mobile object; and determining available information rate for communication between the plurality of terminals and the second base station based on link capacity information for wireless communication between the first base station and the second base station; and controlling each of information rates for the communication between the plurality of terminals and the second base station based on the available information rate,
assessing downlink capacity when the first base station recognizes, based on a first criterion, that it is necessary to assess the downlink capacity, assessing uplink capacity when the second base station recognizes, based on a first criterion, that it is necessary to assess the uplink capacity, wherein the link capacity information comprises uplink capacity information based on the assessed uplink capacity and down link capacity information based on the assessed downlink capacity, the information rates comprise uplink information rates and downlink information rates, the available information rate comprises an available uplink information rate and an available downlink information rate, the step of determining the available information rate comprises determining the available downlink information rate based on the downlink capacity information, and determining the available uplink information rate based on the uplink capacity information, and the step of controlling the information rates comprises controlling the downlink information rates based on the available downlink information rate, and controlling the uplink information rates based on the available uplink information rate.

7. The method according to claim 6, further comprising sending at least one of the first criterion or the second criterion to the first base station or the second base station, respectively.

8. The method according to claim 6, wherein the first criterion and the second criterion are predetermined values of at least one of a signal to noise ratio, a carrier to interference ratio, a symbol to error rate, a bit error rate, or a frame error rate.

* * * * *